US011908106B2

(12) United States Patent
Lee

(10) Patent No.: US 11,908,106 B2
(45) Date of Patent: *Feb. 20, 2024

(54) PROCESSING RECEIVED PIXEL VALUES IN AN IMAGE PROCESSING SYSTEM USING PIXEL VALUE SUBSET GROUPS

(71) Applicant: Imagination Technologies Limited, Kings Langley (GB)

(72) Inventor: Timothy Lee, St. Albans (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/742,320

(22) Filed: May 11, 2022

(65) Prior Publication Data

US 2022/0270200 A1 Aug. 25, 2022

Related U.S. Application Data

(63) Continuation of application No. 16/174,793, filed on Oct. 30, 2018, now Pat. No. 11,361,398.

(30) Foreign Application Priority Data

Oct. 30, 2017 (GB) ..................................... 1717829

(51) Int. Cl.
*G06T 5/00* (2006.01)
*G06T 5/20* (2006.01)
(Continued)

(52) U.S. Cl.
CPC .............. *G06T 5/005* (2013.01); *G06F 18/23* (2023.01); *G06T 1/20* (2013.01); *G06T 5/002* (2013.01);
(Continued)

(58) Field of Classification Search
None
See application file for complete search history.

(56) References Cited

U.S. PATENT DOCUMENTS 6,160,913 A 12/2000 Lee et al.
6,625,318 B1* 9/2003 Tan .................. H04N 25/68
348/E5.081
(Continued)

FOREIGN PATENT DOCUMENTS

CN 101210890 A 7/2008
CN 102113310 A 6/2011
(Continued)

OTHER PUBLICATIONS

Chang et al; "Classifier-Augmented Median Filters for Image Restoration"; IEEE Transactions on Instrumentation and Measurement; vol. 53; No. 2; Apr. 1, 2004; pp. 351-356.
(Continued)

*Primary Examiner* — Edward Martello
(74) *Attorney, Agent, or Firm* — Potomac Law Group, PLLC; Vincent M DeLuca

(57) ABSTRACT

Data processing systems (e.g. image processing systems) and methods are provided for processing a stream of data values (e.g. pixel values). The image processing system comprises a processing module configured to: receive a plurality of pixel values; and implement processing of a particular pixel value by operating on a particular subset of the received pixel values, by: defining a set of one or more groups into which pixel values within the particular subset can be grouped; classifying each of the pixel values within the particular subset into one of the groups of the set of one or more groups based on the value of that pixel value; processing the particular pixel value using one or more of the pixel values of the particular subset in dependence on the
(Continued)

classification of the pixel values of the particular subset into the one or more groups; and outputting the processed particular pixel value.

20 Claims, 9 Drawing Sheets
(2 of 9 Drawing Sheet(s) Filed in Color)

(51) Int. Cl.
  *G06F 18/23* (2023.01)
  *G06V 10/762* (2022.01)
  *G06T 7/12* (2017.01)
  *G06T 1/20* (2006.01)
  *H04N 25/683* (2023.01)

(52) U.S. Cl.
  CPC ............. *G06T 5/20* (2013.01); *G06T 7/12* (2017.01); *G06V 10/762* (2022.01); *G06T 2207/10016* (2013.01); *H04N 25/683* (2023.01)

(56) References Cited

U.S. PATENT DOCUMENTS

| | | | |
|---|---|---|---|
| 10,043,252 | B2 | 8/2018 | Lukac |
| 2004/0174350 | A1 | 9/2004 | Wang |
| 2006/0153475 | A1 | 7/2006 | Ruggiero |
| 2006/0234405 | A1* | 10/2006 | Best ................. H01L 25/0657 257/E21.705 |
| 2007/0160285 | A1 | 7/2007 | Gondek et al. |
| 2008/0075274 | A1 | 3/2008 | Huang et al. |
| 2008/0130991 | A1 | 6/2008 | O'Brien et al. |
| 2012/0183208 | A1 | 7/2012 | Sharman et al. |
| 2012/0307116 | A1 | 12/2012 | Lansel et al. |
| 2013/0114674 | A1 | 5/2013 | Chong et al. |
| 2013/0321676 | A1 | 12/2013 | Silverstein et al. |
| 2017/0091947 | A1* | 3/2017 | Baruch ................. G06T 7/168 |
| 2017/0295329 | A1* | 10/2017 | Ichikawa ............. H04N 1/409 |
| 2018/0350049 | A1 | 12/2018 | Rao et al. |
| 2019/0130209 | A1 | 5/2019 | Lee |

FOREIGN PATENT DOCUMENTS

| | | |
|---|---|---|
| CN | 102396219 A | 3/2012 |
| CN | 102640184 A | 8/2012 |
| CN | 102640489 A | 8/2012 |
| CN | 102742275 A | 10/2012 |
| CN | 103428485 A | 12/2013 |
| CN | 103582911 A | 2/2014 |
| CN | 104012097 A | 8/2014 |
| CN | 104539855 A | 4/2015 |
| CN | 107004255 A | 8/2017 |

OTHER PUBLICATIONS

Kaliraj et al; "An efficient approach for the removal of impulse noise from the corrupted image using neural network based impulse detector"; Image and Vision Computing; vol. 28; No. 3; Mar. 1, 2010; pp. 458-466.

Lee et al; "Scattering-Model-Based Speckle Filtering of Polarimetric SAR Data"; IEEE Transactions on Geoscience and Remote Sensing; vol. 44; No. 1; Jan. 1, 2006; pp. 176-187.

Phophalia et al; "A new denoising filter for brain MR images; Computer Vision, Graphics and Image Processing"; Jan. 1, 2012; pp. 1-8.

Roy et al; "Multiclass SVM based adaptive filter for removal of high density impulse noise from color images"; Applied Soft Computing; vol. 46; Sep. 1, 2016; pp. 816-826.

Seeman, "Digital Image Processing using Local Segmentation," Ph. D. Thesis, School of Computer Science and Software Engineering, Monash University, Australia, Apr. 2002.

* cited by examiner

PROCESSING RECEIVED PIXEL VALUES IN AN IMAGE PROCESSING SYSTEM USING PIXEL VALUE SUBSET GROUPS

CROSS-REFERENCE TO RELATED APPLICATIONS AND CLAIM OF PRIORITY

This application is a continuation under 35 U.S.C. 120 of Application Ser. No. 16/174,793 filed Oct. 30, 2018, which claims foreign priority under 35 U.S.C. 119 from United Kingdom Application No. 1717829.4 filed Oct. 30, 2017.

BACKGROUND

There are many different types of data processing systems which can process a stream of data values. For example, an image processing system may be used as a camera pipeline to process pixel values originating from image sensors in a camera to provide a set of processed pixel values representing a captured image.

An image processing system, such as a camera pipeline, can be arranged to receive a stream of pixel values (e.g. in raster scan order, or any other predetermined order, such as Boustrophedon order) and perform multiple processing functions on the pixel values in order to determine processed pixel values which can then be output, e.g. for display on a display or for storage in a memory or for transmission to another device, e.g. over a network such as the Internet. FIG. 1a illustrates an image processing system 104 which is arranged to receive image data (e.g. pixel values) from an image sensor 102. As is known in the art, the image sensor 102 can include an array of sensors (e.g. charge-coupled devices (CCDs) or complementary metal-oxide-semiconductor (CMOS) sensors) which can sense incident light at respective pixel positions to determine raw image data (e.g. unprocessed pixel values) which can be fed into the image processing system 104. In this way the image sensor 102 captures light and converts it into electrical signals (e.g. image data in the form of pixel values) to be processed in order to generate an image. The image processing system 104 comprises a number of distinct processing modules (e.g. FIG. 1 illustrates k processing modules $106_1$, $106_2$, $106_3$, . . . $106_k$) which implement respective processing functions on the image data to determine the processed image data which represents an image and which is output from the image processing system 104. For example, the image processing system 104 may modify the pixel values (e.g. to improve the perceptual quality of the image) using functions such as filtering and sharpening. Other functions of image processing may be to compress or encode image data into particular formats, such as the Joint Photographic Experts Group (JPEG) format or the Moving Picture Experts Group (MPEG) format.

An image processing system may be implemented in a pipeline arrangement, whereby multiple processing modules of the image processing system perform respective functions on pixel values representing an image. The processing modules $106_1$ to $106_k$ operate on pixel values in turn, in a sequence, and may operate independently of each other. There are many different processing functions which may be performed by respective ones of the processing modules 106. Some examples of the different processing functions which may be applied by a processing module are: adjusting gains applied to the pixel values, adjusting the white balance of the pixel values, detecting defective pixels within the image, correcting defective pixels, filtering (e.g. denoising), sharpening and de-mosaicing, to give just a few examples.

A person skilled in the art would be aware of many different functions that may be performed by different processing modules within the image processing system 104. The exact processing modules to implement, their configuration and the order in which they are implemented in the image processing system 104 (e.g. for use in a camera pipeline) are design choices which are made when the image processing system 104 is designed.

Some of the processing modules operate on individual pixel values, without needing to consider other pixel values. For example, the adjustment of gains and the adjustment of the white balance can be performed for a pixel value without considering other pixel values. In contrast, some of the other processing modules operate on a kernel (i.e. a block or subset) of pixel values. For example, 2D filtering operations such as denoising, defective pixel detection and correction operations, sharpening operations and de-mosaicing operations operate on a kernel of pixel values in order to determine how to process a particular pixel value.

For example, FIG. 1b shows a kernel 120 of pixel values of an image. The kernel 120 includes forty nine pixel values, arranged as a 7×7 block of pixel values, centred on a pixel value 122, which is a current pixel value being processed. Since, in a camera pipeline the pixel values are received row-by-row (e.g. in raster scan order), in order for a processing module 106 to have access to a block of pixel values including pixel values from multiple rows, a line store module may be implemented in the image processing system 104 prior to a processing module 106. Each row of pixel values may for example include hundreds or thousands of pixel values. A line store module can store multiple rows of pixel values, and can provide a contiguous block of pixel values (e.g. the block 120) to the processing module 106 at a time. A line store module is a large block to implement in hardware because it typically needs to be able to store thousands of pixel values at a given time.

Many of the processing functions which may be implemented by the processing modules 106 on blocks of pixel values may involve performing some sort of edge analysis of the image represented by the pixel values within a block. Some examples of edge detection algorithms (such as Sobel edge detection and Canny edge detection) use differential methods. It is noted that the detection of edges within a kernel is super-linearly hard, e.g. the Canny algorithm has a complexity $O(n^2 \log n)$ for a kernel containing n pixels. For example, a denoising filtering function may apply spatial smoothing to the pixel values within a kernel. Denoising is a known process in image processing. For example, the pixel value 122 may be filtered based on other pixel values within the kernel 120, e.g. the pixel value 122 may be smoothed so that it is based on a weighted sum of a plurality of the pixel values within the kernel 120 (e.g. where the weights depend upon the distance between the pixel value 122 and the pixel value being summed). In a simple example, the pixel value 122 may be based on a mean of a plurality of the pixel values within the kernel 120. Spatial smoothing helps to reduce the appearance of random noise in the image. However, it can be perceptually detrimental to an image to smooth pixel values over a distinct edge in an image. This can have the effect of blurring the edge in the image. So a processing module 106 implementing a denoising filter will attempt to determine the presence of an edge within the kernel 120. There are many different algorithms for analysing a kernel of pixel values to determine an edge. The example shown in FIG. 1b shows an edge 124 between two materials (A and B) in the scene being imaged, where the edge 124 passes through the kernel 120. The pixels in the kernel 120 have been labelled as either "A"

or "B" to represent which material is visible in the image at the respective pixel position. The denoising applied to pixel value 122 may be implemented as a weighted sum of (or an average of) only the pixel values labelled A (and not including the pixel values labelled B), where the weights may depend upon the distance to the pixel 122. In this way the processing module 106 can perform a bilateral filtering process to implement the denoising.

Similarly, a processing module 106 which implements sharpening will identify the edge 124 in the kernel 120 and will apply sharpening to pixel values near the edge to increase the differences in pixel values on opposing sides of the edge 124, thereby sharpening the appearance of the edge 124. Sharpening is a known process in image processing.

Defective pixel detection is a known process in image processing. A processing module 106 which implements defective pixel detection on the pixel value 122 aims to detect whether the pixel value is representative of a defective pixel by identifying whether it is significantly and unexpectedly different to nearby pixel values. In order to do this the processing module 106 will identify the edge 124, so that it can compare the pixel value 122 to other nearby pixel values which are expected to be similar because they relate to the same material in the scene (material A).

Defective pixel correction is a known process in image processing. Defective pixel correction may be implemented in the same, or a separate, processing module to one which implements defective pixel detection. If the pixel value 122 has been identified as being representative of a defective pixel, then a processing module 106 which implements defective pixel correction on the pixel value 122 aims to determine a suitable value to assign to the pixel value to replace the defective pixel value. For example, an average (e.g. the mean or the median) of the pixel values within the kernel 120 which represent the same material (material A) could be used to replace the defective pixel value 122. In order to do this the processing module 106 will identify the edge 124 so that it knows which pixel values within the kernel 120 are representative of the same material (material A) as is supposed to be represented by pixel value 122.

De-mosaicing is a known process in image processing. A processing module 106 which implements de-mosaicing aims to reconstruct a full colour image from incomplete colour samples which are output from the image sensor 102. Interpolation may be used for de-mosaicing, but similar to denoising, the interpolation is only performed over pixel values which are determined to be representing the same material. So in order to perform de-mosaicing for the pixel value 122, a processing module 106 will identify the edge 124 so that it knows which pixel values within the kernel 120 are representative of the same material (material A) and can therefore be used in the interpolation of the de-mosaicing process.

Typically, edge detection methods for detecting edges within a kernel can only detect a single edge within the kernel.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There are a number of problems associated with processing a stream of pixel values in a camera pipeline using a sequence of processing modules, such as described in the background section above and shown in FIG. 1a.

For example, since each of the processing modules 106 in the image processing system 104 operates independently, the different processing modules 106 may be designed separately. It is possible that inconsistent edge determinations may be made in the different processing modules. Inconsistent edge determinations across the different processing modules can result in artefacts appearing in the image.

As mentioned above, standard methods for detecting edges within a kernel can only detect a single edge within the kernel. There may be situations in which a kernel includes more than one edge, and standard edge detection algorithms might not be able to detect all of the edges within the kernel. An alternative approach is to use a clustering approach in which data values within a kernel are grouped (or "clustered") into one or more groups. Clustering algorithms are able to group the data values within a kernel into more than two groups, and can cope with corners within the kernel. However, clustering is a problem which is known to be "NP hard", i.e. non-deterministic polynomial-time hard. As such it is difficult to implement a clustering algorithm multiple times in multiple processing modules for each pixel value of an image in a camera pipeline in real-time as images are captured by the image sensor 102. In fact, it is so difficult that a clustering algorithm has not been used in this way in the prior art. As an example, current state of the art cameras tend to be configured to capture images with many millions of pixels.

Furthermore, different processing modules might be implementing functions with at least partially contradictory aims. For example, a denoising function will tend to reduce differences between pixel values, whereas a sharpening function will tend to increase differences between pixel values. If each block is implemented separately it can be difficult to achieve a suitable balance between the contradictory processes, which may tend to fight against each other. Therefore, tuning of the image processing system 104 can be difficult because changes to one processing module 106 may have unforeseen consequences on the operation of another processing module 106.

According to examples described herein, there is provided an image processing system configured to process pixel values, the image processing system comprising a processing module configured to:
  receive a plurality of pixel values; and
  implement processing of a particular pixel value by operating on a particular subset of the received pixel values, by:
    defining a set of one or more groups into which pixel values within the particular subset can be grouped;
    classifying each of the pixel values within the particular subset into one of the groups of the set of one or more groups based on the value of that pixel value;
    processing the particular pixel value using one or more of the pixel values of the particular subset in dependence on the classification of the pixel values of the particular subset into the one or more groups; and
    outputting the processed particular pixel value.

The classification of a pixel value into one of the groups might not be based on the spatial position of the pixel value.

Said defining a set of one or more groups may comprise defining a pixel value range for each of the groups, wherein said classifying each of the pixel values within the particular subset into one of the groups may comprise comparing the pixel value to one or more of the defined pixel value ranges for the groups.

The set of one or more groups may comprise a plurality of groups. The set of groups may comprise three or more groups.

The image processing system may be configured to process the pixel values in real-time.

Said processing the particular pixel value may comprise performing, in a consolidated operation, multiple processing functions which depend upon the classification of pixel values of the particular subset into the one or more groups.

For example, the multiple processing functions may comprise two or more of: (i) defective pixel detection, (ii) defective pixel correction, (iii) denoising, (iv) sharpening, and (v) de-mosaicing.

The image processing system may further comprise a store configured to store group indication data which indicates one or more groups into which pixel values can be grouped, wherein the processing module may be configured to process, in each of a plurality of iterations, a respective particular pixel value of the stream by operating on a respective particular subset of pixel values of the stream, by, in each of the plurality of iterations: retrieving, from the store, group indication data for at least one group; using the retrieved group indication data to define the set of groups into which pixel values within the particular subset can be grouped; performing said: (i) classifying each of the pixel values within the particular subset into a group of a set of groups, and (ii) processing the particular pixel value using one or more of the pixel values of the particular subset in dependence on the classification of the pixel values of the particular subset into the groups; and storing, in the store, group indication data for at least one group of the set of groups, for use in a subsequent iteration. Said storing group indication data for at least one group may comprise storing, as an indicative value for a group, an average value of the pixel values which are classified as being part of that group. Said storing group indication data for at least one group may comprise storing at least one of: (i) an indication of the spread of the data values which are classified as being part of that group, (ii) an indicative position of the data values which are classified as being part of that group, and (iii) an indication of the number of members of the group.

Group indication data for a group may indicate a range of pixel values which are to be classified into the group.

The group indication data for a group may comprise an indicative value within the range of pixel values which are to be classified into the group. The extent of the range of pixel values around the indicative value may be defined by a calibration process. The calibration process may be a static calibration process, a dynamic calibration process or a real-time calibration process.

The group indication data for a group may comprise indications of the upper and lower bounds of the range of pixel values which are to be classified into the group.

The received plurality of pixel values may be part of a stream of pixel values. For example, the image processing system may be implemented in a camera pipeline. The stream of pixel values may represent an image as a two-dimensional array of pixel values, and wherein each of the subsets of pixel values within the stream of data values may represent a contiguous block of pixel values within the two-dimensional array. A particular subset of pixel values may represent a block of pixel values which includes and surrounds the corresponding particular pixel value.

The set of groups may comprise up to n groups, and the processing module may be further configured to: after the classification of the pixel values of the particular subset into the groups, and prior to said processing the particular pixel value, selectively discard one or more of the groups based on the number of pixel values which are classified into each of the groups, such that up to m groups are maintained, where $n \geq m$. Said processing the particular pixel value using one or more of the pixel values of the particular subset in dependence on the classification of the pixel values of the particular subset into the one or more groups may comprise: if the particular pixel value is within a maintained group, determining that the particular pixel value is not representative of a defective pixel; and if the particular pixel value is not within a maintained group, determining that the particular pixel value is representative of a defective pixel.

The processing module may be configured to: determine, for each of at least one group of the set of groups, a centroid representative of a position of the group; and determine, for each of the at least one group of the set of groups, an average value of the pixel values within the group. Said processing the particular pixel value may comprise applying one or more of denoising, sharpening and de-mosaicing to the particular pixel value based on the at least one determined centroid of the at least one group. Said processing the particular pixel value may comprise, if the particular pixel value is determined to be representative of a defective pixel: selecting one or more of the maintained groups based on the determined centroids of the groups, and replacing the particular pixel value with a value based on the determined one or more average values for the one or more selected groups.

There is provided a method of processing pixel values in an image processing system, the method comprising:
  receiving a plurality of pixel values; and
  implementing processing of a particular pixel value by operating on a particular subset of the received pixel values, by:
    defining a set of one or more groups into which pixel values within the particular subset can be grouped;
    classifying each of the pixel values within the particular subset into one of the groups of the set of one or more groups based on the value of that pixel value;
    processing the particular pixel value using one or more of the pixel values of the particular subset in dependence on the classification of the pixel values of the particular subset into the one or more groups; and
    outputting the processed particular pixel value.

In some examples, there is provided a data processing system configured to process a stream of data values, the data processing system comprising:
  a store configured to store group indication data which indicates one or more groups into which data values can be grouped; and
  a processing module configured to process, in each of a plurality of iterations, a respective particular data value of the stream by operating on a respective particular subset of data values of the stream, by, in each of the plurality of iterations:
    retrieving, from the store, group indication data for at least one group;
    using the retrieved group indication data to define a set of groups into which data values within the particular subset can be grouped;
    classifying each of the data values within the particular subset into one of the groups of the set of groups;
    processing the particular data value using one or more of the data values of the particular subset in dependence on the classification of the data values of the particular subset into the groups; and storing, in the store, group indication data for at least one group of the set of groups, for use in a subsequent iteration;

wherein the processing module is configured to output the processed data values.

There is provided an image processing system configured to process a stream of pixel values, the image processing system comprising:

a processing module configured to implement processing of a particular pixel value of the stream by operating on a particular subset of pixel values of the stream, by:

classifying each of the pixel values within the particular subset into a group of a set of groups;

processing the particular pixel value using one or more of the pixel values of the particular subset in dependence on the classification of the pixel values of the particular subset into the groups, wherein said processing the particular pixel value comprises performing, in a consolidated operation, multiple processing functions which depend upon the classification of pixel values of the particular subset into the groups; and outputting the processed particular pixel value.

There is provided an image processing system configured to process pixel values, the image processing system comprising a processing module configured to:

receive a plurality of pixel values, each of the received pixel values having a first number of bits; and implement processing of a particular pixel value by operating on a particular subset of the received pixel values, by:

classifying each of the pixel values within the particular subset into a group of a set of one or more groups;

determining an average value in respect of the pixel values within the particular subset which are classified into one of the one or more groups, wherein the determined average value has a second number of bits, wherein said second number is greater than said first number;

replacing the particular pixel value based on the determined average value; and outputting the processed particular pixel value.

The data processing systems and image processing systems described herein may be embodied in hardware on an integrated circuit. There may be provided a method of manufacturing, at an integrated circuit manufacturing system, a data processing system and/or an image processing system as described herein. There may be provided an integrated circuit definition dataset that, when processed in an integrated circuit manufacturing system, configures the system to manufacture a data processing system or an image processing system as described herein. There may be provided a non-transitory computer readable storage medium having stored thereon a computer readable description of an integrated circuit that, when processed, causes a layout processing system to generate a circuit layout description used in an integrated circuit manufacturing system to manufacture a data processing system or an image processing system as described herein.

There may be provided an integrated circuit manufacturing system comprising:

a non-transitory computer readable storage medium having stored thereon a computer readable integrated circuit description that describes a data processing system or an image processing system as described herein;

a layout processing system configured to process the integrated circuit description so as to generate a circuit layout description of an integrated circuit embodying the data processing system or the image processing system as described herein; and an integrated circuit generation system configured to manufacture the data processing system or the image processing system according to the circuit layout description.

Although methods described herein are best suited to being implemented in dedicated hardware, the methods could be implemented in software running on general purpose hardware. Therefore, there may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

The patent or application file contains at least one drawing executed in color. Copies of this patent or patent application publication with color drawings will be provided by the Office upon request and payment of the necessary fee.

Examples will now be described in detail with reference to the accompanying drawings in which.

Figure 1A:
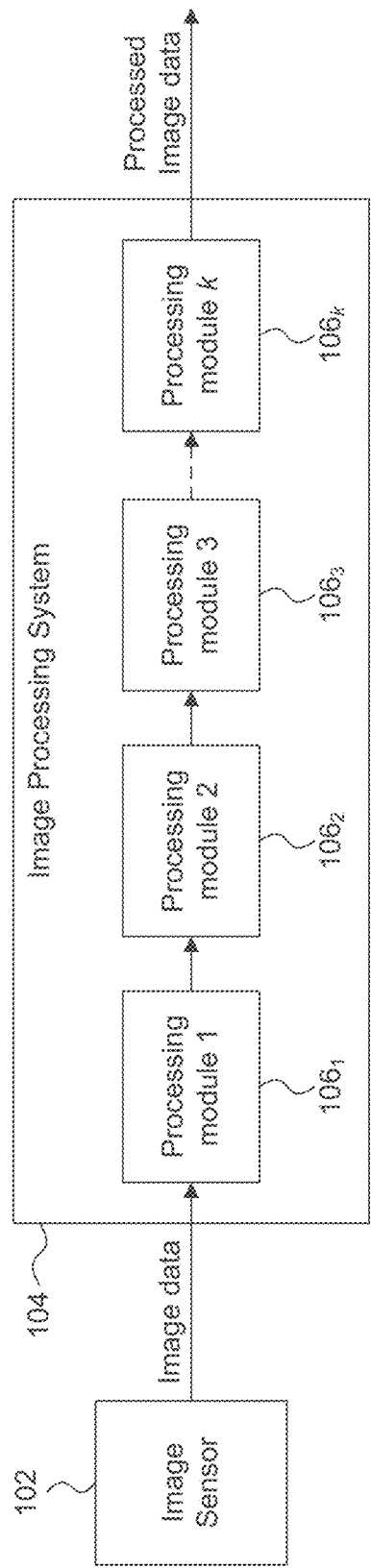
FIG. 1a shows an example image processing system of the prior art.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. According to embodiments described herein, a stream of data values (e.g. pixel values) is processed in a data processing system (e.g. an image processing system such as a camera pipeline). As an example, processed pixel values may represent an image.

It has been appreciated that where a processing module processes a particular data value from the stream by operating on a respective subset of data values surrounding the particular data value (e.g. a kernel of data values centred on the particular data value that is currently being processed), the subset of data values which are operated on for a particular data value in the stream will at least partially overlap with the subset of data values which are operated on for another (e.g. the next) data value in the stream. Therefore, some information relating to the subset of data values for processing one data value in the stream is relevant to, and can be used for, the subset of data values for processing the next data value in the stream. In other words, information from processing a current data value in the stream (e.g. group indication data which indicates one or more groups into which data values can be grouped) can be used to simplify the task of processing the next data value in the stream (e.g. for defining a set of groups into which data values can be grouped). In this way, the processing involved in performing clustering on the data values within a subset of data values can be shared between consecutive data values in the stream. This reduces the latency and power consumption of the image processing system, in contrast to prior art systems in which each data value in the stream is processed separately.

In particular, the Bayesian principle of using prior knowledge can simplify the clustering problem. Groups which are determined for clustering of data values within a previous subset (the preceding subset) are likely to be similar to the groups which are determined for clustering of data values within a current subset because the two subsets partially overlap with other (e.g. the two subsets may substantially overlap with each other). Therefore, we can use the previous groups defined for the previous data value as a starting point for defining the groups to use for the current data value. When the current data value has been processed, group indication data for the groups that have been used for the current data value can be stored, so that in the next iteration (i.e. when processing the next data value of the stream) the group indication data can be retrieved and used to define the groups into which data values within the next subset can be grouped. This greatly simplifies the clustering problem so that it is deterministically solvable in real-time (i.e. it is no longer an NP hard problem) even on devices which have tight restrictions on processing power and size (e.g. mobile devices such as handheld cameras, smart phones and tablets, etc.).

Figure 1B:
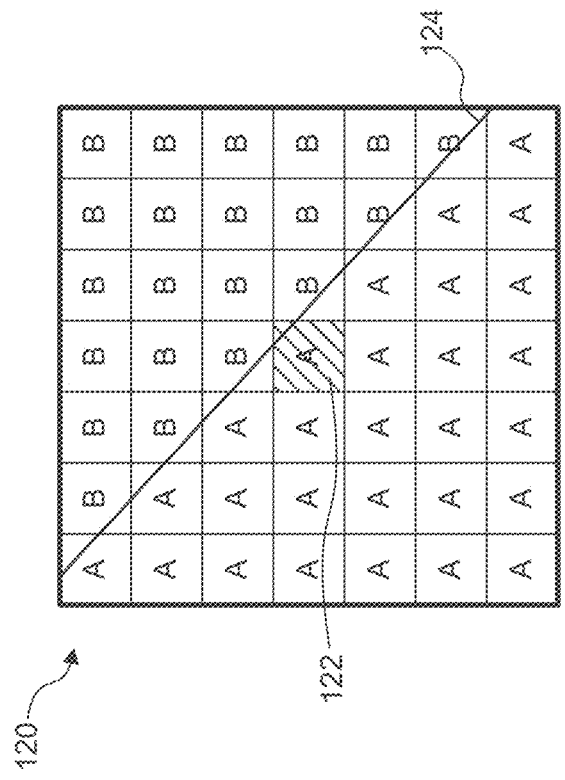
FIG. 1b shows a 2D array of pixel values representing an image.

Therefore, in some examples described herein, an edge detection algorithm is not used to identify groups of data values within a kernel, and instead a clustering algorithm is used to identify the groups of data values within the kernel. Edge detection usually results in a binary split of the data values within a kernel into two groups: one group on either side of the detected edge. For example, as described above, FIG. 1b shows the pixel values being classified as either A or B based on their positions relative to the edge 124. In this way, the edge 124 is thinned (or thresholded) down to a single pixel width. However, in reality, edges in images are often soft, and may have finite widths such that some pixels can lie within an edge rather than on one side or the other, such that a set of "fuzzy", or half-toned, pixel values may exist along the edge. Edge detectors will split these edge pixel values into one of the two groups defined by the edge. Making the wrong choice or ascribing an intermediate value (lying on or near the edge 124) to either group A or B (as shown in FIG. 1b) may lead to mis-classification of pixels, which in turn may lead to poor performance and the introduction of errors along or near the edge 124 in the processed image data. However, in contrast, a clustering algorithm may generate a separate group for the intermediate pixel values which are between the values of pixels within groups A and B. In particular, a clustering algorithm can easily group the pixel values within a kernel into more than two groups. Furthermore, in a clustering algorithm, the grouping of the pixel values within a kernel does not depend upon the spatial position of the pixel values within the kernel. In this sense the clustering algorithm is free to classify a pixel value that is within a kernel to a group without considering the spatial position of the pixel value within the kernel. Instead, a set of groups are defined into which pixel values within a particular subset can be grouped, and then each of the pixel values within the particular subset are classified into one of the groups based on the value of that pixel value. For example, the groups may be defined by defining a range of pixel values for each of the groups, wherein each of the pixel values within a particular subset is grouped into one of the groups by comparing the pixel value to one or more of the defined pixel value ranges for the groups.

The clustering approach used in examples described herein can cope with: (i) any angle of edge (i.e. the angle of an edge is not considered), (ii) corners (e.g. if a quadrant within the kernel is different to the rest of the kernel, (iii) more than one edge within the kernel, and (iv) soft edges (e.g. edges with a finite width which may span over one or more pixels, such that some pixels may be located within an edge). This is in contrast to standard edge detectors which cannot cope with any of the four situations mentioned above.

Furthermore, since data is shared between consecutive data values in the stream, it is possible to use a smaller kernel size and still retain good processing results compared to prior art systems in which each data value in the stream is processed separately. For example, a 5×5 kernel could be used rather than a 7×7 kernel, which approximately halves the number of data values in the kernel. A reduction in the size of the kernels tends to reduce the silicon area of the image processing system and reduce the processing power consumed by the image processing system.

Furthermore, in examples described herein, multiple processing functions (which would typically be performed by separate processing modules) which depend upon the classification of pixel values of a subset into groups, are performed in a consolidated operation (e.g. by a single processing module). This means that the clustering process only needs to be performed once for the multiple processing functions. The multiple processing functions may for example comprise two or more of: (i) defective pixel detection, (ii) defective pixel correction, (iii) denoising, (iv) sharpening, and (v) de-mosaicing. Consolidating multiple functions can reduce the number of processing modules and the number of line store modules in the image processing system, which will reduce the silicon area and power consumption of the image processing system. Furthermore, by applying the multiple processing functions in a consolidated operation (e.g. with a single processing module) it is simpler to tune the operation of the functions compared to when the different functions are implemented by separate blocks. The tuning is particularly simplified for functions which may tend to fight against each other, such as denoising and sharpening. The tuning is also simplified for functions which replicate some functionality, such as defective pixel detection and defective pixel correction. Furthermore, by performing, in a consolidated operation, multiple processing functions which depend upon the classification of data values of the particular subset into the groups, the classification of the data values into the groups is consistent for the multiple processing functions, thereby avoiding artefacts which may occur due to inconsistent clustering decisions for different functions.

Furthermore, in some examples, a pixel value can be replaced with an average of pixel values within a group of similar pixel values. This averaging process can be used to enhance (i.e. increase) the dynamic range of the pixel values. For example, an average value can be determined with more bits than the number of bits in each of the individual input pixel values.

The processing modules in the image processing system may be implemented in hardware, e.g. in fixed function circuitry. Dedicated fixed function hardware is typically more efficient at processing data values (in terms of processing speed and power consumption) compared to implementing the processing modules by running software on general purpose hardware. Implementing the processing modules in hardware is not as flexible as implementing the processing modules in software in the sense that the operation is difficult (or impossible) to change after the hardware has been manufactured, whereas software can easily be changed by loading different software code into a memory storing the software to be executed. However, in a data processing system such as a camera pipeline or other system which processes a stream of data values in a fixed manner in real-time, the advantages of implementing the processing modules in hardware (in terms of processing speed and power consumption) tend to outweigh the disadvantage of the inflexibility of a hardware implementation. By implementing multiple processing functions in a single consolidated operation, the number of processing modules is reduced in the image processing system, thereby significantly reducing the size (in terms of silicon area) of the hardware implementing the data processing system. For example, four or five distinct processing modules in a prior art system could be consolidated down to just one processing module in examples described herein.

Figure 2:
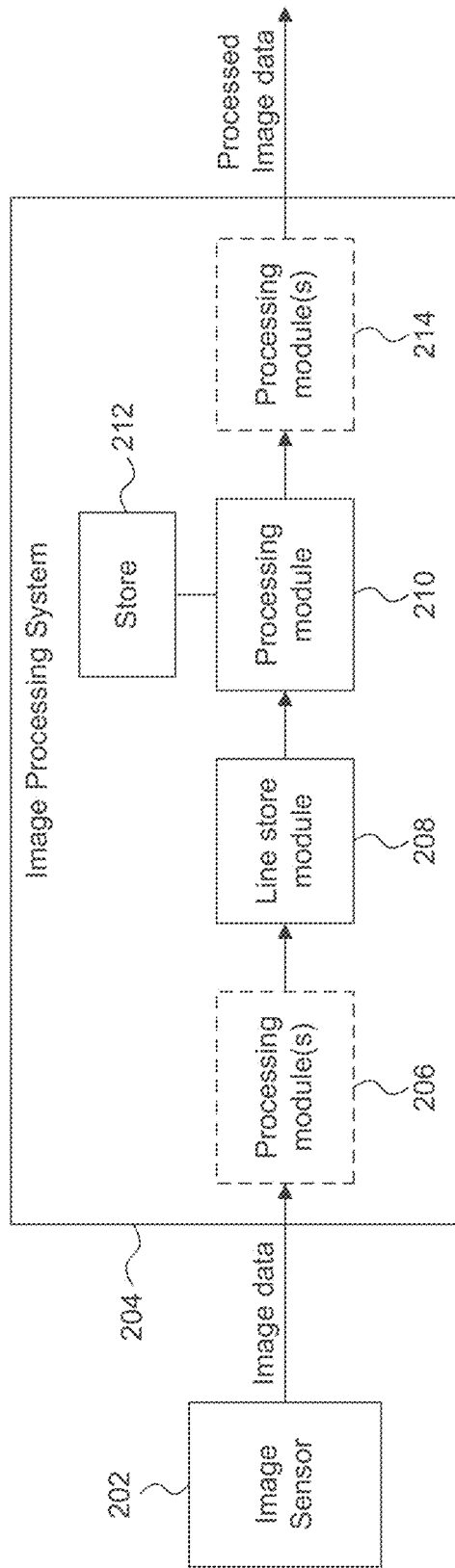
FIG. 2 shows an image processing system according to examples described herein.

Examples are described below with reference to an image processing system, but concepts described herein could be applied to other types of data processing systems (e.g. audio processing systems and signal processing systems) which process streams of data values. FIG. 2 illustrates an image processing system 204 which is arranged to receive image data (e.g. pixel values) from an image sensor 202. The image data received from the image sensor 202 may be referred to as "raw" image data or "unprocessed" image data. As described above, an image sensor, such as the image sensor 202, can include an array of sensors (e.g. charge-coupled devices (CCDs) or complementary metal-oxide-semiconductor (CMOS) sensors) which can sense incident light at respective pixel positions to determine raw image data (e.g. unprocessed pixel values) which can be fed into the image processing system 204. The image processing system 204 could be described as a camera pipeline. The system shown in FIG. 2 may be implemented in a device, such as a camera. In some examples, the image sensor 202 may capture a sequence of images, which can be used to represent frames of a video sequence. The image data may be in one of many different possible formats, for example the pixel values may be monochrome pixel values, wherein each pixel value relates to the same, single colour channel. In other examples, the pixel values may comprise Red, Green and Blue (RGB) values to represent the intensity of the respective three colour channels at the respective pixel positions. In some examples, the raw image data may relate to multiple colour channels, but the raw image data for each particular pixel position may include only a single colour value (e.g. a red, green or blue colour value), arranged in a pattern such as a Bayer pattern, and in these examples a de-mosaicing process may be performed such that a full set of colour values (e.g. three colour values, such as red, green and blue colour values) are determined for each pixel position. A de-mosaicing process is described below. Other colour formats may be used in other examples. The image sensor 202 may provide the pixel values to the image processing system 204 in a raster scan order, such that pixel values for lines of pixels (e.g. rows of pixels) are received and processed in the image processing system 204 as they are received from the image sensor 202 in real-time.

The image processing system 204 may comprise a number of processing modules 206, 210 and 214 for applying respective processing functions to the image data. The processing modules may, for example, be implemented in dedicated hardware modules (e.g. in fixed function circuitry) such that they can be optimised for performing specific processing functions on the pixel values in an efficient manner (e.g. "efficient" in terms of at least one of latency, power consumption and silicon area). The image processing system 204 also comprises a store 212 which is coupled to the processing module 210. As described in more detail below, the store 212 is configured to store group indication data which indicates one or more groups into which pixel values can be grouped. The processing module(s) 206 and 214 are represented with dashed boxes because the number of these modules may vary in different implementations and that number may be zero in some implementations. The processing module(s) 206 and 214 may perform any suitable functions on pixel values, e.g. adjusting gains of the pixel values, adjusting the white balance of the pixel values, etc. If a processing module requires access to pixel values from more than one line of the image (e.g. a 2D filtering module) then a line store module (or "line store bank") can be implemented in the image processing system 204 prior to the processing module. For example, processing module 210 requires access to multiple rows of pixel values, e.g. the processing module 210 may be configured to implement a 2D filtering process, defective pixel detection, defective pixel correction, sharpening and/or de-mosaicing. As described above, in these types of processes, a particular pixel value can be processed based on the pixel values within a kernel of pixel values including the particular pixel value (e.g. centred on the particular pixel value). The line store module 208 is implemented to store pixel values for multiple lines of pixels and can provide pixel values from multiple lines to the processing module 210. Processed image data is output from the image processing system 204, and may be used in any suitable manner, e.g. output to a display, stored in memory, transmitted to another device, etc.

Operation of the image processing system 204 is described with reference to the flow chart shown in FIG. 3. The image sensor 202 captures image data, e.g. pixel intensity values for different pixels within an image. Techniques for capturing these pixel intensity values at the image sensors are known in the art and the details of this process are beyond the scope of this description. In step S302 the image processing system 204 receives a stream of data values from the image sensor 202. The pixel values are fed from the image sensor 202 to the image processing system 204 in a particular order, thereby forming a stream of pixel values, e.g. raster scan order in which rows of pixel values are received in turn at the image processing system 204. It would be possible for the pixel values to be passed to the image processing system 204 in a different order, e.g. Boustrophedon order, and it is possible for multiple lines of pixel values to be passed to the image processing system 204 at once, in parallel. However, since the image sensor 202 and the image processing system 204 may be designed by different parties, it is convenient for there to be a presumed, or standard, order in which pixel values are passed from the image sensor 202 to the image processing system 204, and raster scan order is the usual order used. Therefore, in the examples described herein we refer to receiving rows of pixel values in a raster scan order, but it should be apparent that other orders could be used, and that columns of pixel values could be received rather than rows, so where we refer to "rows" of pixel values it is to be understood that we are generally referring to "lines" of pixels values, which could for example be rows or columns.

As described above, the image processing system 204 may, or may not, perform some processing on the pixel values in the processing module(s) 206 before the pixel values are stored in the line store module 208. As described above, the line store module 208 allows pixel values from multiple rows to be provided to the processing module 210 together.

Figure 4:
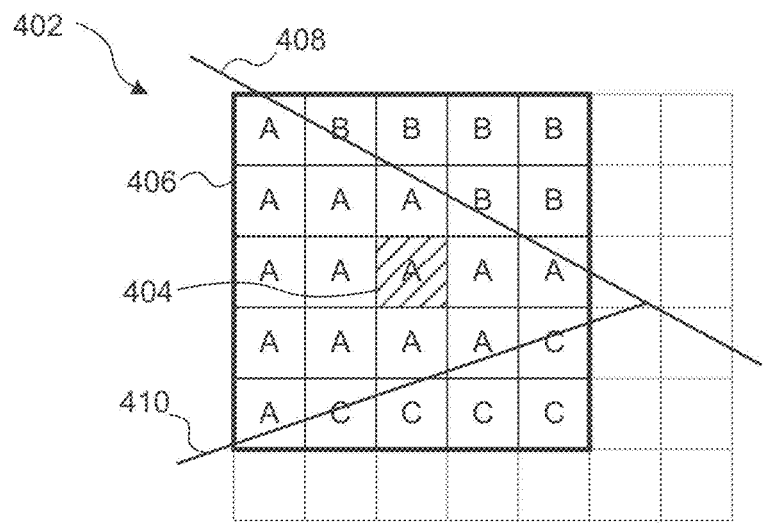
FIG. 4 shows a 2D array of data values, highlighting a first subset of the data values which will be used for processing a first data value in the 2D array.

FIG. 4 shows an example in which the stream of pixel values represents a two-dimensional array of pixel values 402 forming an image, wherein the array includes six rows of pixel values, with each row including seven pixel values. Obviously, in more complex examples, there may be many more pixel values within an image, e.g. millions of pixel values arranged such that there are hundreds or thousands of rows and hundreds or thousands of columns of pixels.

The processing module 210 processes a particular pixel value 404 by operating on the pixel values within the 5×5 kernel 406, which surrounds and includes pixel value 404 (e.g. the kernel 406 is centred on pixel value 404). In step S304, the processing module 210 receives the twenty five pixel values in the kernel 406 from the line store module 208. The kernel 406 defines a subset of pixel values which represents a contiguous block of pixel values within the two-dimensional array of pixel values representing the image.

In step S305 a subset index subset index i is set such that i=0, for the processing of a first subset (e.g. the kernel 406).

In step S306, the processing module 210 defines a set of one or more groups into which pixel values of a first subset (i.e. pixel values within the kernel 406) can be grouped. This can be done by analysing the pixel values of the subset 406 and performing a clustering process to group the pixel values into groups based on their pixel values. This may involve an edge detection process to identify edges between different materials (i.e. sharp changes in appearance) in the image. FIG. 4 shows two edges (408 and 410) in the scene, such that three distinct areas are formed within the kernel 406. Therefore, three groups are defined (A, B and C).

In step S308 the processing module 210 classifies each of the pixel values of the subset 406 into one of the groups (A, B or C) of the set of groups. In FIG. 4 each pixel value is denoted with either "A", "B" or "C" to represent which group the pixel value has been classified into.

In step S310 the processing module 210 processes the pixel value 404 in dependence on the classification of the pixel values of the subset 406 into the groups (A, B or C). The processing performed by the processing module 210 may, for example, involve one or more of defective pixel detection, defective pixel correction, denoising, sharpening and de-mosaicing. It is noted that the denoising (or filtering) referred to herein is performed in the spatial domain, i.e. it is spatial denoising (or spatial filtering). If the processing module 210 performs more than one processing function, these processing functions may be performed in a consolidated manner, such that contradictory aims of the different processing functions can be controlled in a consistent manner, and such that tuning of the image processing system is simplified.

In step S312 the processed pixel value 404 is outputted from the processing module 210 for use in the image processing system 204. The processed pixel value may be used by other processing modules 214 within the image processing system 204, and/or outputted from the image processing system 204.

In step S314 the processing module 210 stores group indication data in the store 212, which can be used when processing the next pixel value. The group indication data provides an indication of the three groups (A, B and C) which were used when processing the pixel value 404. For example, step S314 may involve storing, as an indicative value for a group, an average value μ (e.g. the mean value or the median value) of the pixel values which were classified as being part of that group in step S308. Therefore, as an example, three indicative values $\mu_A$, $\mu_B$ and $\mu_C$ may be stored to indicate the three groups A, B and C. As described in more detail below, the group indication data which is stored for a group may include a centroid position for the group, which may be used as part of a defective pixel correction process to choose a suitable group from which an average value can be used to replace a defective pixel value.

Figure 5:
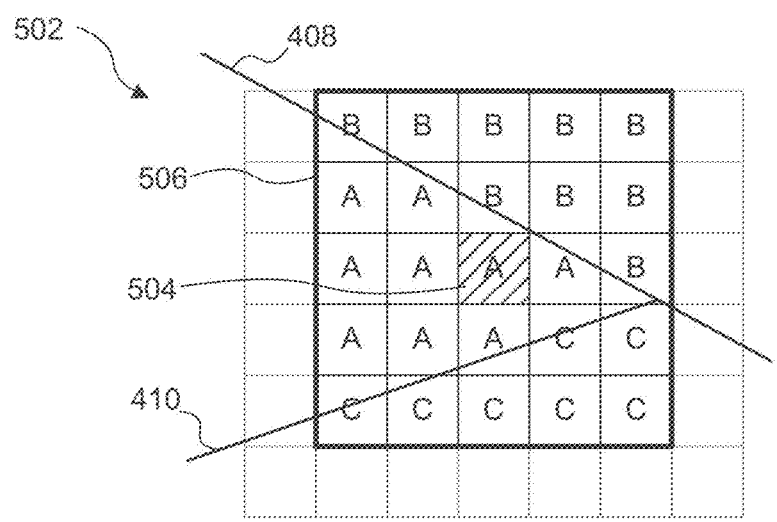
FIG. 5 shows a 2D array of data values, highlighting a second subset of the data values which will be used for processing a second data value in the 2D array.

FIG. 5 shows a two dimensional array of pixel values 502 forming an image, which is the same image as that described above with reference to FIG. 4. FIG. 5 illustrates the situation when the processing module 210 is processing the next pixel value 504 after the pixel value 404 shown in FIG. 4 (where "next" refers to a raster scan order in this example). In order to process the pixel value 504, the processing module 210 operates on a kernel 506 which defines a subset of pixel values in the image. Since the image is the same in FIGS. 4 and 5, the edges 408 and 410 are in the same place in both Figures. It can be appreciated that the subset of pixel values 506 partially overlaps with the subset of pixel values 406 which were used to process the pixel value 404. In step S316, the index i is incremented, such that on the first iteration step S316 involves setting the subset index to 1.

Figure 6:
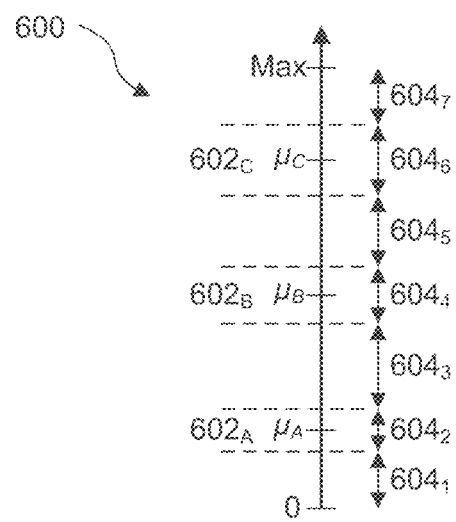
FIG. 6 illustrates ranges of data values spanned by different groups of data values.

In step S318 the processing module 210 retrieves the group indication data stored for the previous subset (i.e. the $(i-1)^{th}$ subset) from the store 212. The group indication data indicates, for a group, the range of values which fall into that group. The group indication data may take different forms in different examples, but as described above the group indication data for a group may represent an indicative value for the group (e.g. determined as an average (e.g. mean or median) value of the pixel values which were included in that group in the previous iteration). As an example, three indicative values ($\mu_A$, $\mu_B$ and $\mu_C$) may be retrieved in step S318, which have values represented in FIG. 6. FIG. 6 illustrates a scale 600 of possible pixel values, ranging from 0 to the maximum possible pixel value ("Max") which is, for example, set by the number of bits in a pixel value. For example, if a pixel value has eight bits, then the maximum integer pixel value which can be represented is 255, so the full range of possible pixel values would span from 0 to 255. It is clear that, in other examples, other numbers of bits could be used for the pixel values such that the value of Max can be different. Furthermore, in some examples, pixel values may be in a format in which they are allowed to be negative such that zero would not be at the bottom of the range. The group indication data for a group which is retrieved in step S318 may include an indication of a centroid position for the group.

In the example described above, a pixel value comprises a single colour component. For example, in a monochrome image, each pixel value relates to the same, single colour channel. For simplicity and clarity, an example is described herein in relation to the pixel values of a monochrome image. However, as explained in more detail below, in another example, an image may include pixel values which collectively relate to multiple colour channels, but it may be the case that each particular pixel value relates to a single one of those colour channels. For example, an image sensor may generate pixel values in accordance with a predetermined pattern (e.g. a Bayer pattern, such that some pixel values represent Red colour values, some pixel values represent Blue colour values, and some pixel values represent Green colour values). A de-mosaicing process can be applied to generate full colour data (e.g. three colour components for each pixel). In a further example, each pixel value may comprise a plurality of colour components (e.g. after a de-mosaicing process has been performed). As an example, a pixel value could comprise three components (e.g. red, green and blue components), each of which may for example have eight bits. The concepts used in the methods described herein, which are primarily described with reference to a monochrome image comprising pixel values relating to a single colour channel, could be used for processing chromatic images in which pixel values comprise data relating to a plurality of colour channels (either before or after de-mosaicing). It is noted that, in examples described herein, where a pixel value has multiple components the classification of the pixel into one of the groups is determined once per pixel (not once per component), i.e. each component of the pixel value is classified into the same group. This ensures that consistent clustering decisions are made across all the colour channels.

Figure 7:
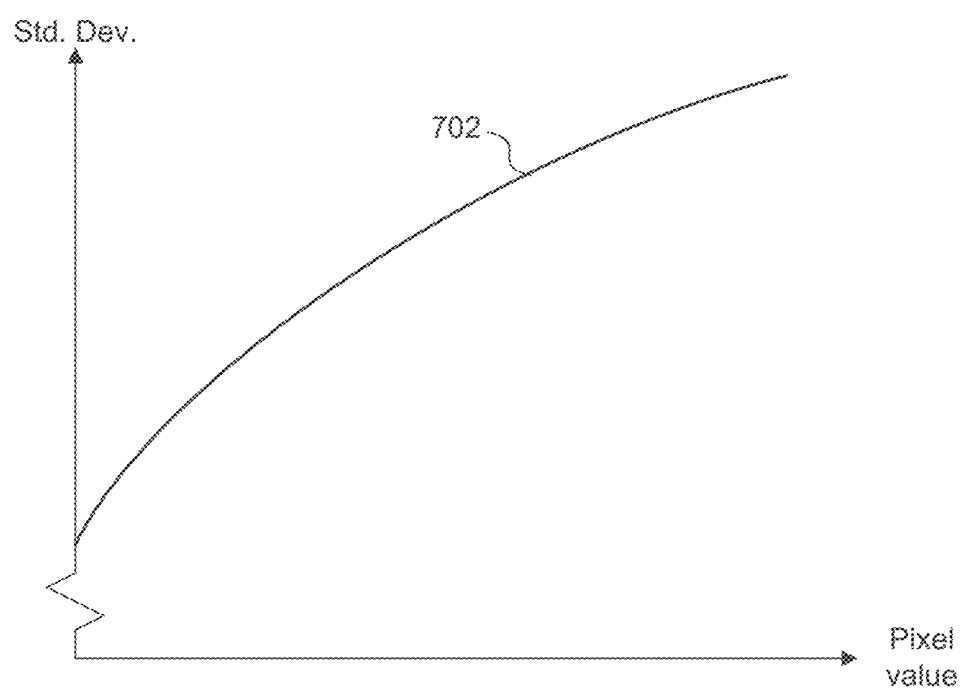
FIG. 7 shows a calibration curve used to determine the extent of a range of a group as a function of the average value of the group.

In step S320, the processing module 210 uses the retrieved group indication data (e.g. the indicative values $\mu_A$, $\mu_B$ and $\mu_C$) to define a set of groups into which data values within the $i^{th}$ subset 506 can be grouped. For example, a calibration process can be used to define an extent of a range of data values around an indicative value $\mu$ for a group. For example, FIG. 7 is a graph showing a calibration curve 702.

The calibration curve shows a typical standard deviation that is experienced due to noise in the image sensor 202, as a function of the pixel value. As the pixel value increases the standard deviation tends to increase. The calibration curve 702 can be pre-set (e.g. during design time) based on a likely noise experienced by a generic image sensor, such that the calibration curve is not specifically tailored for the particular image sensor 202. As an alternative, the calibration process may be performed on the sensor at manufacture time (e.g. when it has been manufactured) and the calibration curve 702 may be stored at the manufacture time (this may be referred to as a "static" calibration process). Alternatively, the calibration curve 702 could be set by testing the specific image sensor 202 to detect a standard deviation for different pixel values. In other words, the sensor noise curve (or "calibration curve") may be generated from an analysis of the noise in a real-time image. This could be done by using the image sensor 202 to determine pixel values for an object with a uniform colour and brightness, and determining differences in the pixel values. By altering the colour and brightness of the object, typical standard deviations could be detected across the range of pixel values, thereby determining the calibration curve 702. For example, the calibration of the sensor could be performed based on earlier, recently processed images (this may be referred to as a "dynamic" calibration process). Some examples may use a "real-time" calibration process in which the calibration is determined for an iteration and results of the calibration are stored with the group indication data, such that they can be used on the next iteration.

The calibration curve 702 can be used to define ranges of pixel values around the indicative values $\mu_A$, $\mu_B$ and $\mu_C$, such that three groups $602_A$, $602_B$ and $602_C$ can be defined. The extents of the ranges of the groups $602_A$, $602_B$ and $602_C$ are shown with dashed lines in FIG. 6. The extents of the ranges may be determined in different ways in different examples. To give some examples, a range around an indicative value $\mu$ may be given by $\pm\sigma$, $\pm 2\sigma$ or $\pm\sigma^2$, where $\sigma$ is the standard deviation as indicated by the calibration curve 702 for the indicative value $\mu$ (such that $\sigma^2$ is the variance). It can be seen that the size of the value range $602_A$ is smaller than the size of the value range $602_B$, which itself is smaller than the size of the value range $602_C$. This is because, according to the calibration curve 702, the range of a group extends further from the indicative value $\mu$ for larger indicative values $\mu$. There may be a respective calibration curve for each colour component (e.g. red, green and blue components), or there may be a single calibration curve which is used for all of the colour components. In the example described above the extent of a range depends only on the expected noise (e.g. as indicated by the calibration curve). However, in some examples the variation may be dependent upon factors (e.g. surface shading or texture) other than the noise. Furthermore, in some examples, a calibration curve is not used to define the ranges. For example, the extents for each range could be of equal size, which may be fixed or variable.

In the example given above, the indicative value $\mu$ for a group is the average value of the data values in that group, such that the group range extends either side of the indicative value $\mu$. In other examples, the indicative value could represent another value within the range of values of a group, e.g. the indicative value for a group could be the minimum or maximum of the values within a group such that the group range extends on only one side of the indicative value (e.g. only above the indicative value if the indicative value is a minimum value of a group, and only below the indicative value if the indicative value is a maximum value of a group). Furthermore, although in the example described above, the group indication data that is stored for a group in the store 212 is just the indicative value μ, (e.g. where the extents of the group around the indicative value are inferred from the calibration curve 702), in other examples it would be possible to store, as the group indication data for a group, the upper and lower bounds of the range of pixel values which are to be classified into the group. This would mean that more data (e.g. twice as much data in a naïve system) would be stored in the store 212 to indicate the groups, but there would be no need to use a calibration curve. In both of these examples, the group indication data for a group indicates (perhaps indirectly) a range of data values which are to be classified into the group.

Three groups have been defined which correspond with the groups $602_A$, $602_B$, $602_C$ that were used in the previous iteration. Further groups are defined by the gaps between these groups, such that up to seven groups are determined in this example, as indicated by the ranges $604_1$ to $604_7$. Therefore, in this example, the processing module 210 has defined seven groups 604 which collectively span the entire range of possible data values. The groups 604 are contiguous so they do not overlap with each other. This means that for every possible pixel value (from zero to Max in the example shown in FIG. 6) one, and only one, group 604 is defined. In some cases, fewer than seven groups may be defined, e.g. if group $602_A$ started at zero.

It is noted that in this 1D example, where the data values are single-component values, the groups $602_A$, $602_B$ and $602_C$ are simple to define, and the gaps between those groups create further well-defined groups. In other examples in which the data values have multiple components (e.g. Red, Green and Blue components), groups can be defined as regions (e.g. cuboids, or other simple shapes) surrounding the indicative values (p) for the groups. The regions are chosen so that they do not overlap with each other. In these multi-component examples, the group/region definitions can be updated in much the same way as the groups in the 1D example described in detail herein. However, the gaps between regions are not so well defined. One option for handling the gaps in a multi-component example is to not define groups for the gaps. This would mean that some possible pixel values would not fall into one of the groups. Another option for handling the gaps in a multi-component example is to define a single "gap" group, whereby any pixel value which does not fall into one of the regions (e.g. cuboids) surrounding an indicative value for a group is categorised into the "gap group". In this way "good space" can be tracked by the regions (e.g. cuboids) and the rest of the value space can be flagged as "bad" (or "noise", "broken", "needs fixing").

In general, group indication data for up to m groups may be retrieved from the store 212 in step S318, wherein the defined set of groups into which pixel values can be grouped comprises up to n groups, where n≥m, with the extra defined groups being defined by the gaps between and around the retrieved groups. In general m≤n≤2m+1, and as an example n may be equal to 2m+1. In the 1D example given above in which there is a gap either side of each of the retrieved groups, m=3 and n=7.

In step S322 the processing module 210 classifies each of the pixel values within the $i^{th}$ subset 506 into one of the groups 604 defined in step S320. Each of the pixel values within the subset 506 is classified into one of the groups 604 based on the value of that pixel value. In other words, if the pixel value falls into the value range for a particular group then the pixel value is classified into that particular group. In FIG. 5 each pixel value is denoted with either "A", "B" or "C" to represent which group the pixel value has been classified into. Group A corresponds to group $604_2$, group B corresponds to group $604_4$ and group C corresponds to group $604_6$.

Steps S318 to S322 are much simpler to implement than steps S306 and S308. Steps S318 to S322 turn the clustering problem into one which is not NP hard, and is solvable in real-time even on devices such as handheld cameras, smartphone and tablets which have tight restrictions on size and power consumption. This is achieved by applying the Bayesian approach such that knowledge of the groups used in the previous iteration is used as a starting point (i.e. as "priors") for defining the groups to use for the current iteration. Steps S318 and S320 define the groups 604 without needing to analyse the pixel values in the subset 506, and so these steps can be performed very quickly on hardware which covers a small silicon area, with little power consumption. Furthermore, once the groups ($604_1$ to $604_7$) have been defined, it is simple to classify each of the pixel values into one of the groups by comparing the pixel value to the ranges of the values covered by the groups. The classification of a pixel value from the subset 506 into one of the groups does not depend upon the position of the pixel value within the subset 506. Therefore the classification process does not need to analyse the positions of the pixel values, and can simply compare the pixel value to the ranges of values defined for each of the groups. Since the classification of a pixel value does not depend upon the position of the pixel value and does not look for specific edges, it can be a simpler process than an edge detection process which attempts to identify the positions of the edges 408 and 410 within the image in order to determine regions within the kernel 506 which are associated with the different materials in the scene, and can then classify each pixel value based on its position and the positions of the determined regions. One other advantage to the grouping method of steps S318 to S322 is that the orientation of edges in the image does not affect the effectiveness of the grouping process. This is in contrast to some known edge detection algorithms such as a Sobel filter which only looks for edges at certain angles. For example, a Canny filter typically uses a vertical Sobel filter and a horizontal Sobel filter, and then attempts to combine them into a general filter; whereas by contrast, the clustering approach taken in the examples described herein can cope with all angles and curved edges and corners, etc.

As described in more detail below, after the pixel values in the subset 506 have been classified into the seven groups $604_1$ to $604_7$, and prior to processing the pixel value 504 in step S324 some of the groups may be discarded based on the number of data values which are classified into each of the groups 604. With reference to the example described above in which group indication data is retrieved in step S318 for up to m groups and in which up to n groups are defined in step S320, where n≥m, then some of the groups may be discarded, such that m groups are maintained. For example, if m groups are retrieved and n groups are defined then (n−m) groups may be discarded. For example, after step S322, the population of the seven groups $604_1$ to $604_7$ can be analysed to determine which three of the groups 604 are the most highly populated, and those three groups will be maintained (e.g. groups $604_2$, $604_4$ and $604_6$ may be maintained), whilst the other four groups will be discarded (e.g. groups $604_1$, $604_3$, $604_5$ and $604_7$ may be discarded).

In some examples, different numbers of groups are discarded, and in some other examples no groups are discarded at this stage.

It is noted that in the example described above, the group which includes pixel 504 itself may have been discarded. However, in some examples (e.g. examples in which defective pixel correction is not being implemented), the group which includes pixel 504 is considered to be an interesting group (when processing pixel 504 itself), worthy of maintaining, even if it is not one of the most highly populated groups. So in these examples, the group including pixel 504 is maintained irrespective of the population of that group, and then one or more other groups may also be maintained based on their respective populations.

Furthermore, in some examples, it is possible to merge two or more groups together to form a merged group. For example, rather than discarding a group, the group may be merged with another nearby group ("nearby" in terms of the values represented by the group). For example, two small groups with very similar values may sometimes be better represented as one group.

In step S324 the processing module 210 processes the pixel value 504 in dependence on the classification of the pixel values of the subset 506 into the groups. The processing performed by the processing module 210 may for example involve one or more of: (i) defective pixel detection and/or defective pixel correction), (ii) denoising, (iii) sharpening and (iv) de-mosaicing. For example, the processing performed by the processing module 210 may for example involve two or more of: (i) defective pixel processing (e.g. defective pixel detection and/or defective pixel correction), (ii) denoising, (iii) sharpening and (iv) de-mosaicing. In some examples, the processing module performs a plurality of processing functions including denoising and sharpening. As described in more detail below with reference to the example flow chart shown in FIG. 8, the processing module 210 may perform more than one processing function in a consolidated operation. This can help to control contradictory aims of the different processing functions in a consistent manner which can be easily tuned.

In step S326 the processed pixel value 504 is outputted from the processing module 210 for use in the image processing system 204. The processed pixel value may be used by other processing modules 214 within the image processing system 204, and/or outputted from the image processing system 204.

In step S328 the processing module 210 stores group indication data in the store 212, which can be used when processing the next pixel value. The group indication data provides an indication of the maintained groups (e.g. groups $604_2$, $604_4$ and $604_6$) which were used when processing the pixel value 504 in step S324. For example, step S328 may involve storing, as an indicative value for a group, an average value μ (e.g. the mean value, the median value, a weighted mean value or a mean of a trimmed set of the pixel values in the group (e.g. the mean of the interquartile of pixel values in a group) to give just some examples of average values which could be used) of the pixel values which were classified as being part of that group in step S322. Therefore, as an example, three indicative values $\mu_A$, $\mu_B$ and $\mu_C$ may be stored to indicate the three groups $604_2$, $604_4$ and $604_6$). The group indication data which is stored for a group may include an indicative position (e.g. a centroid position) for the group, which may be used as part of a defective pixel correction process to choose a suitable group from which an average value can be used to replace a defective pixel value. Other examples of indicative positions include a weighted centroid position and an average trimmed centroid for the group. Furthermore, group indication data which is stored for a group may include an indication of the spread of the data values which are classified as being part of that group, which may be used to define a range for the group. Useful indications of the spread of the data values include a standard deviation, a range, and an interquartile range to give just some examples. Furthermore, group indication data which is stored for a group may include an indication of relevance of the group (e.g. the number of members of the group, i.e. the number of pixel values which have been included in that group).

In some examples, the pixel values may be grouped into fewer than three distinct groups (e.g. if all of the pixel values within a subset have the same pixel value then only one group is populated). In these situations, group indication data for fewer than three (i.e. fewer than m) groups is stored in step S328. This is why in some cases, group indication data for fewer than three (i.e. fewer than m) groups may be retrieved in step S318 on some iterations.

In step S330 the processing module 210 determines whether there are any more pixel values to process, and if there are, then the method passes back to step S316 in which the index i is incremented and the method repeats by performing steps S318 to S328 for the next pixel value. If it is determined in step S330 that there are no more pixel values to process then the method ends in step S332.

Figure 3:
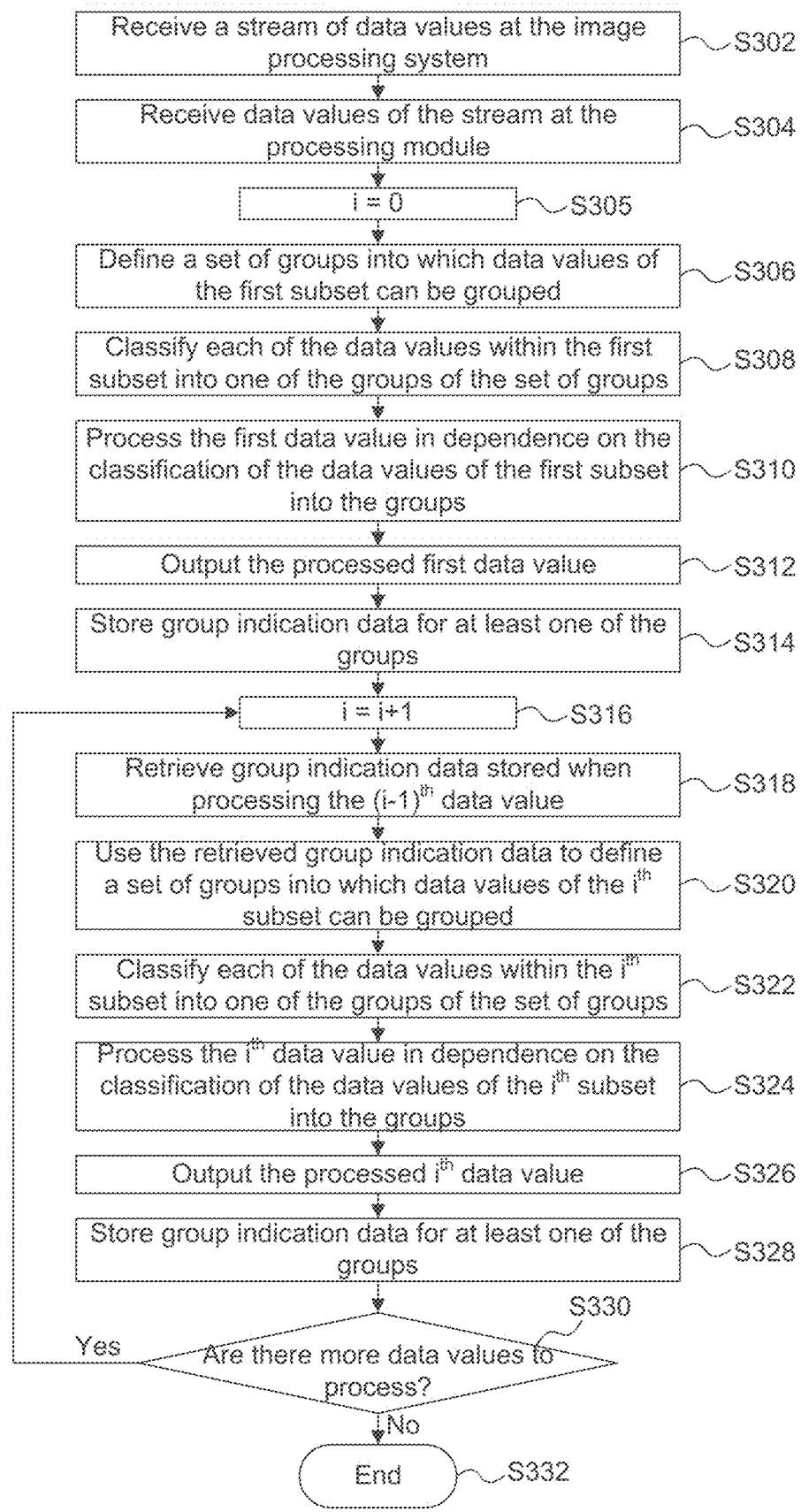
FIG. 3 is a flow chart for a method of processing a stream of data values.

In the method shown in FIG. 3 each processed pixel value is outputted as it has been determined (e.g. in steps S312 and S326). It would be possible to output groups of processed pixel values in batches when a whole batch of pixel values has been processed. For example, when a row of pixel values have been determined then all of the processed pixel values in that row could be outputted together. Furthermore, the method could wait until all of the pixel values within an image have been processed before any of them are outputted.

Figure 8:
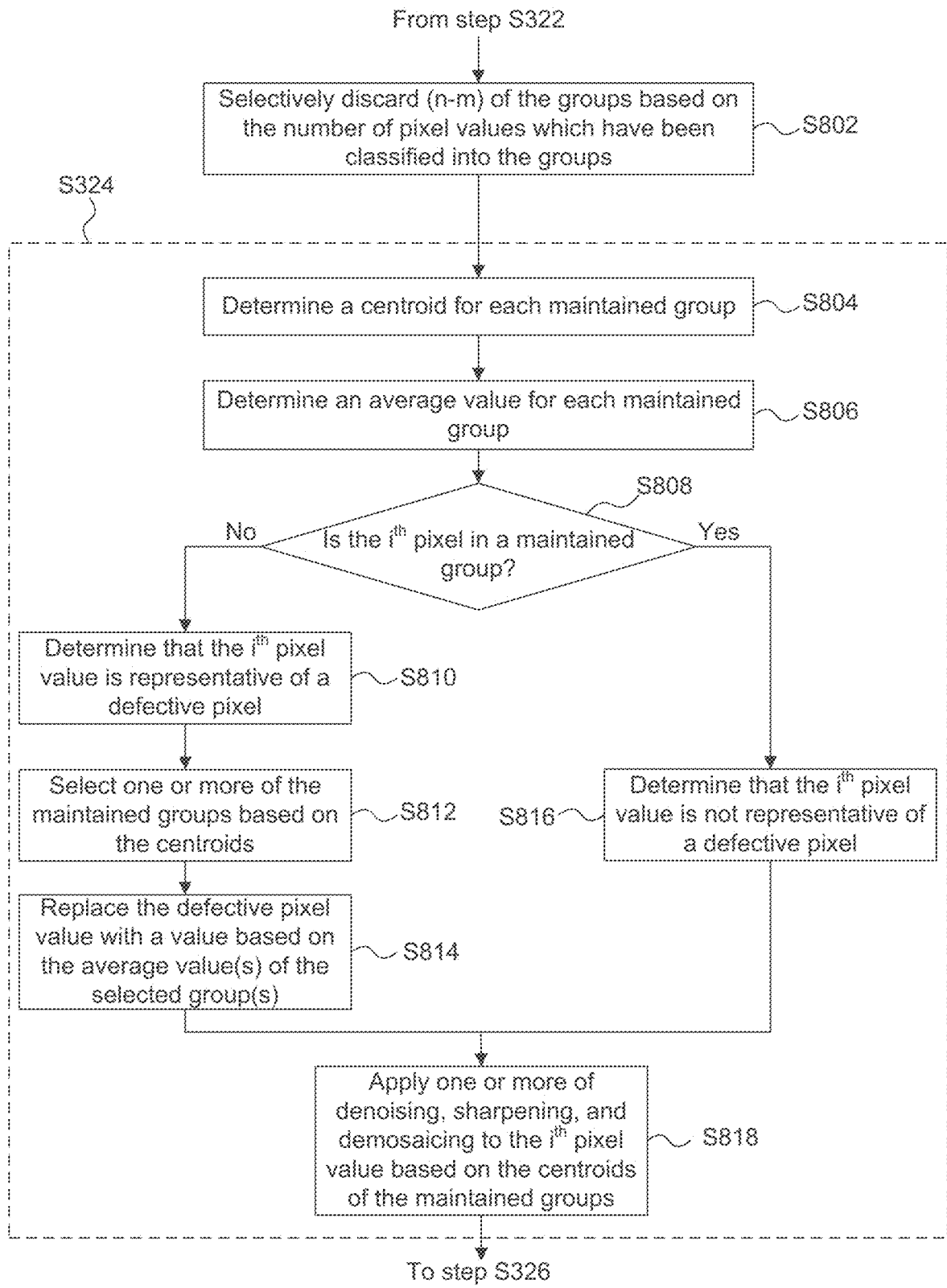
FIG. 8 is a flow chart showing some of the steps involved in processing a pixel value in examples described herein.

FIG. 8 is a flow chart of an example showing steps that are performed by the processing module 210 to perform multiple processing functions in a consolidated operation in step S324. The multiple processing functions comprise two or more of: defective pixel detection, defective pixel correction, spatial denoising, sharpening and de-mosaicing.

Following the classification step S322, the method passes to step S802 in which, as described above, one or more of the groups that were defined in step S320 are selectively discarded, such that m groups are maintained. As described in the example given above, the groups with the lowest numbers of pixel values are discarded. Therefore, the least populated groups are discarded. Following step S802 m groups are maintained and the method passes to step S324, which comprises the steps S804 to S818 as described in more detail below.

In step S804 the processing module 210 determines a centroid for each of the maintained groups. The centroid for a group is representative of a position of the group. This position is a spatial position of a group within the image. A centroid may be determined for a group by finding an average (e.g. mean) position of the pixel values which have been classified into the group. Alternatively, a centroid may be determined for a group by finding a weighted average (e.g. a weighted mean) position for the pixel values which have been classified into the group, e.g. in which higher weights are applied to pixel values which are closer to the centre of the group compared to the weights applied to pixel values which are further from the centre of the group (e.g. where the distance may be measured as a Euclidean distance or a Manhattan distance).

In step S806 the processing module 210 determines an average value for each of the maintained groups. The average value for a group may be a mean, or a median, of the pixel values which have been classified into that group. The average value for a group provides a representative value of the pixel values within the group.

In step S808 the processing module 210 determines whether the current pixel value being processed (e.g. pixel value 504) is within one of the maintained groups. The current pixel value is the $i^{th}$ pixel value, and may be referred to as the particular pixel value.

In the example shown in FIG. 8, defective pixel correction is one of the processes being performed. If the current pixel value is not within one of the maintained groups then the method passes to step S810 in which it is determined that the current pixel value is representative of a defective pixel. For the $i^{th}$ pixel value 504 to not be within one of the maintained groups, it must be dissimilar to most of the other pixel values in the subset 506, which is interpreted as meaning that the pixel value 504 is a defective pixel. In other words, if the pixel value 504 did not represent a defective pixel it is unlikely that the pixel value would not be in one of the maintained groups. In this way, the defective pixel detection function has been performed.

In step S812 the processing module 210 selects one or more of the maintained groups, based on the centroids of the maintained groups determined in step S804. For example, the processing module 210 may select the closest of the maintained groups to the pixel value 504, based on the centroids of the maintained groups determined in step S804. For example, with reference to FIG. 5, if pixel value 504 was determined to be representative of a defective pixel (i.e. it was not classified as being part of group A) then the centroids of the groups A, B and C would be considered to determine which was closest to the position of the pixel value 504 in the image. In this example, the centroid for group A would be the closest centroid to the position of the pixel value 504. In this example, the centroids for groups B and C would be further than the centroid for group A from the position of the pixel value 504. Therefore, in this example, group A would be selected in step S812 for the pixel value 504 (if the pixel value was determined to be representative of a defective pixel).

In step S814, the defective pixel is replaced with a value based on the determined average value(s) for the selected group(s). If a single group was selected in step S812 then the processing module 210 replaces the $i^{th}$ pixel value 504 with the average value of the selected group which was determined in step S806. In the example shown in FIG. 5, the pixel value 504 could be replaced with an average value (e.g. a mean or a median value) of the pixel values in group A. The average of the pixel values which are included in the closest maintained group is a suitable value to assign to the pixel value 504 if it is determined to be defective. If there are multiple (e.g. two) substantially equally close maintained groups, and the pixel value 504 is not within either of them, then it is probable that the pixel value 504 is on or near an edge between the closest of the maintained groups. In this scenario, multiple groups are selected in step S812, and in step S814 a suitable value to replace the pixel value 504 with is a weighted average of the averages of the closest maintained groups. The weights of the weighted average may be determined based on the distances between the position of the pixel value 504 and the centroid positions of the (e.g. two) closest maintained groups.

In this way, the defective pixel correction function has been performed in steps S812 and S814. Following step S814 the method passes to step S818 which is described below.

If, in step S808, it is determined that the current pixel value 504 is within one of the maintained groups then the method passes to step S816 in which it is determined that the current pixel value 504 is not representative of a defective pixel. For the $i^{th}$ pixel value 504 to be within one of the maintained groups, it must be similar to at least some of the other pixel values in the subset 506, and this is interpreted as meaning that the pixel value 504 is not a defective pixel. The method then passes to step S818.

In step S818 the processing module 210 applies one or more of denoising, sharpening and de-mosaicing to the $i^{th}$ pixel value based on the determined centroids of the maintained groups. The centroids of the groups can be used to indicate whether the $i^{th}$ pixel is close to an edge (e.g. edge 408 or 410). For example, the $i^{th}$ pixel may be located at a position (0,0). If the centroid of another group (i.e. a group that does not include the $i^{th}$ pixel) is close to the position (0,0) then there is an edge near to the $i^{th}$ pixel. What constitutes "close to" in this context is an implementation decision, and may be different in different examples.

If the $i^{th}$ pixel value is not close to an edge then spatial denoising can be applied based on the pixel values within the same group as the pixel value 504 to reduce the appearance of random noise in the image, and in this case little or no sharpening may be applied to the pixel value 504. The denoising may involve replacing the pixel value 504 with an average of the pixel values within the same group (e.g. group A). The average may, for example, be a mean, a weighted mean and a mean of a trimmed set of pixel values (e.g. a mean of the interquartile range). The pixel values that are received at the processing module 210 may have b bits, where to give some examples, b may be 8, 10 or 12. These pixel values may originate from a sensor, and it may be the case that one or more of the least significant bits (LSBs), e.g. the two least significant bits, of the pixel values are essentially representing noise. This noise may be a combination of one or more of: noise resulting from analogue to digital conversion (ADC noise), thermal noise, quantisation noise, power plane noise and random Gaussian noise. In accordance with the Central Limit theorem, all of these types of noise get reduced in a deterministic fashion by a denoising process which takes the average of a group of pixel values. The clustering approach described herein enables a pixel value to be replaced with an average of similar pixel values from its local area, i.e. an average of the group of which the pixel value is a part. This enables the precision of the pixel values to be increased, i.e. the noise in the pixel values can be reduced. In particular, the signal to noise ratio (SNR) of the pixel values can be better (i.e. higher) than the SNR of the pixel values output from the sensor. This is achieved without any temporal averaging, such that it can be achieved in real-time on pixel values of an image, e.g. in a camera pipeline. For example as described above, one or more of the LSBs of the incoming pixel values received at the processing module 210 may be dominated by noise (e.g. two of the LSBs of the input pixel values may be dominated by noise); whereas the pixel values output from the processing module may have fewer LSBs which are dominated by noise (e.g. none or one of the LSBs of the output pixel values may be dominated by noise).

If the $i^{th}$ pixel value is close to an edge then sharpening may be more strongly applied to enhance the sharpness of the edge, e.g. such that the difference between the two groups either side of the edge is accentuated. This can be done by biasing the $i^{th}$ pixel value away from the average value of the pixels in the group on the other side of the edge. In this case the spatial denoising does not filter over the edge so as to avoid blurring the edge, and instead the spatial denoising just filters over pixel values which have been classified into the same group as the $i^{th}$ pixel value.

Some de-mosaicing techniques are known in the art which use groups of similar colour values. Having formed the groups of pixels using the novel methods described herein, those groups can be used in existing algorithms that use groups, such as de-mosaicing. In order to prevent, or at least reduce, the introduction of chroma artefacts, de-mosaicing is applied based on the pixel values which have been classified into the same group as the $i^{th}$ pixel value (and not based on the pixel values which have been classified into other groups). As described above, the classification of the pixel values into the groups is consistent for different colour channels. An example of de-mosaicing is described with reference to a Bayer image in which 50% of the pixel values are for the Green channel, 25% of the pixel values are for the Red channel, and 25% of the pixel values are for the Blue channel. The outputs of the de-mosaicing process are Red, Green and Blue values for each of the pixels. The Green plane is processed first to determine values for the green component of the pixel values of the current group (i.e. the group including the $i^{th}$ pixel) which did not initially have a Green pixel value. This can be done by interpolating, predicting or guessing the Green component values. Therefore, at the end of this first stage, we have a Green component value for each pixel in the current group being processed. Intensity differences between pixels of the current group (i.e. the group including the $i^{th}$ pixel) in the Green colour channel can then be used to interpolate in the Red and Blue colour channels in order to determine the Red and Blue component values for pixels of the current group which did not initially have Red or Blue pixel values respectively. The determination of the pixel values of the Red and Blue planes in this second pass can be performed with a bi-linear filter to reconstruct the missing 75% of data, based on weightings determined by the Green plane. Failure to accurately detect/locate an edge (i.e. failure to correctly assign the pixel values to the groups) may generate erroneous pixels/colours because pixel values from other groups would then distort the determined pixel values for the current group.

Following step S818 the method passes to step S326 described above.

By applying multiple processing functions within the same processing module 210, consistent decisions are made about how a pixel value is to be processed and the processing of pixel values is deterministic and simple to tune. For example, the denoising and sharpening functions are performed in a consolidated operation so that the functions don't apply contradictory operations to a particular pixel value. Similarly chroma errors are less likely to be produced from the de-mosaicing process, leading to a lower acceptable level of spatial denoising, and hence a higher level of image definition.

In the example shown in FIG. 8 defective pixel correction is one of the processes being performed. In some other examples, defective pixel fixing is not one of the processes being performed, and as such steps S808, S810, S812, S814 and S816 are not performed.

FIG. 8 shows an example in which multiple processing functions are applied within the same processing module 210, as incorporated into the method shown in FIG. 3 in which the pixel values are classified into groups according to a clustering approach as described above. However, in alternative examples, the concept of applying multiple processing functions within the same processing module in a consolidated manner is not reliant on the manner in which the pixel values are classified into groups. Therefore, in some examples, an edge detection process could be used to classify the pixel values within a subset into one or more groups, and then the multiple processing functions could be applied in a consolidated manner, wherein the multiple processing functions depend upon the classification of pixel values of the subset into the groups. Therefore the method may comprise detecting an edge within a current subset (e.g. using known edge detection techniques), wherein each of the pixel values within the current subset is classified into one of the groups of the set of groups based on the relative position of the pixel value compared to the detected edge.

FIGS. 9a to 10b illustrate examples in which the processing module 210 is used to apply defective pixel detection, defective pixel correction, denoising and sharpening to two test images. These examples do not implement de-mosaicing, but de-mosaicing could be included in other examples.

Figure 9A:
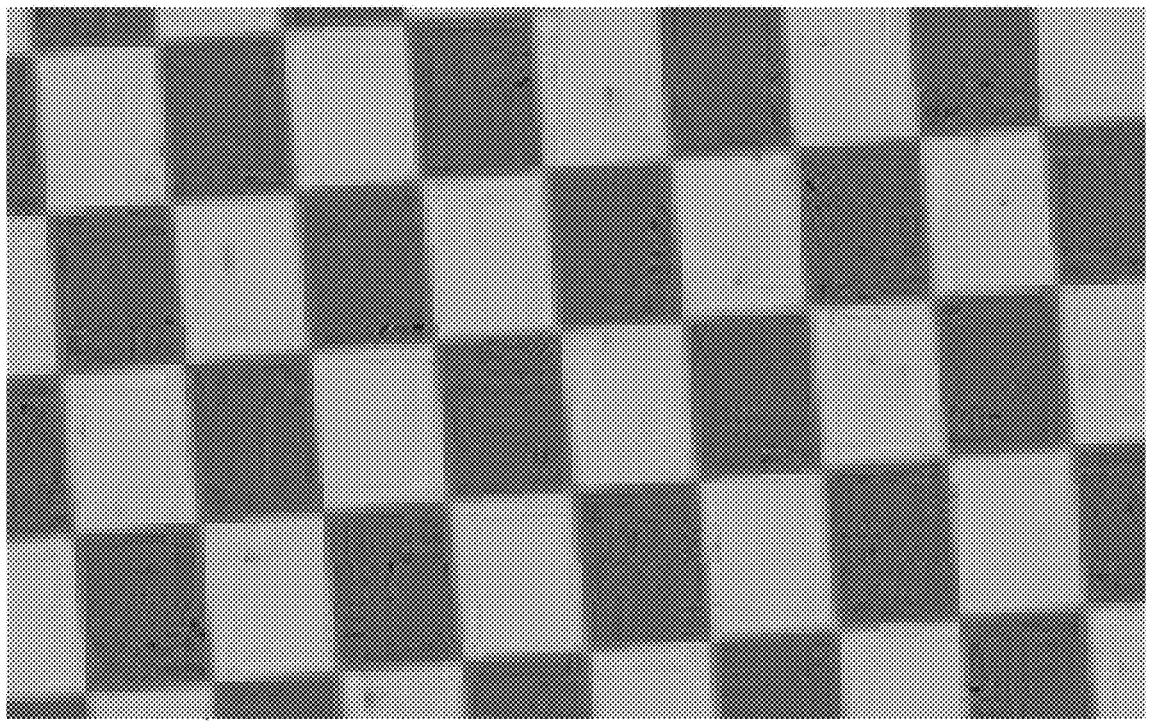
FIG. 9a shows a representation of a first example image which is received at a processing module.

FIG. 9a shows a representation of a first example image 902 which is received at the processing module 210. The image 902 has been artificially generated as a test image so that it has a large number of defective pixels (approximately one in every 300 pixels is defective in the image 902, whereas a real, poor quality sensor might typically have one in every 2000 pixels being defective), so the test image 902 is worse in terms of defective pixels than a standard image captured by a real image sensor. The image 902 has random noise applied to it, which can be seen in the 'speckled' nature of the otherwise flat regions. Furthermore, the image 902 has been downsampled so the edges between different regions have been blurred.

Figure 9B:
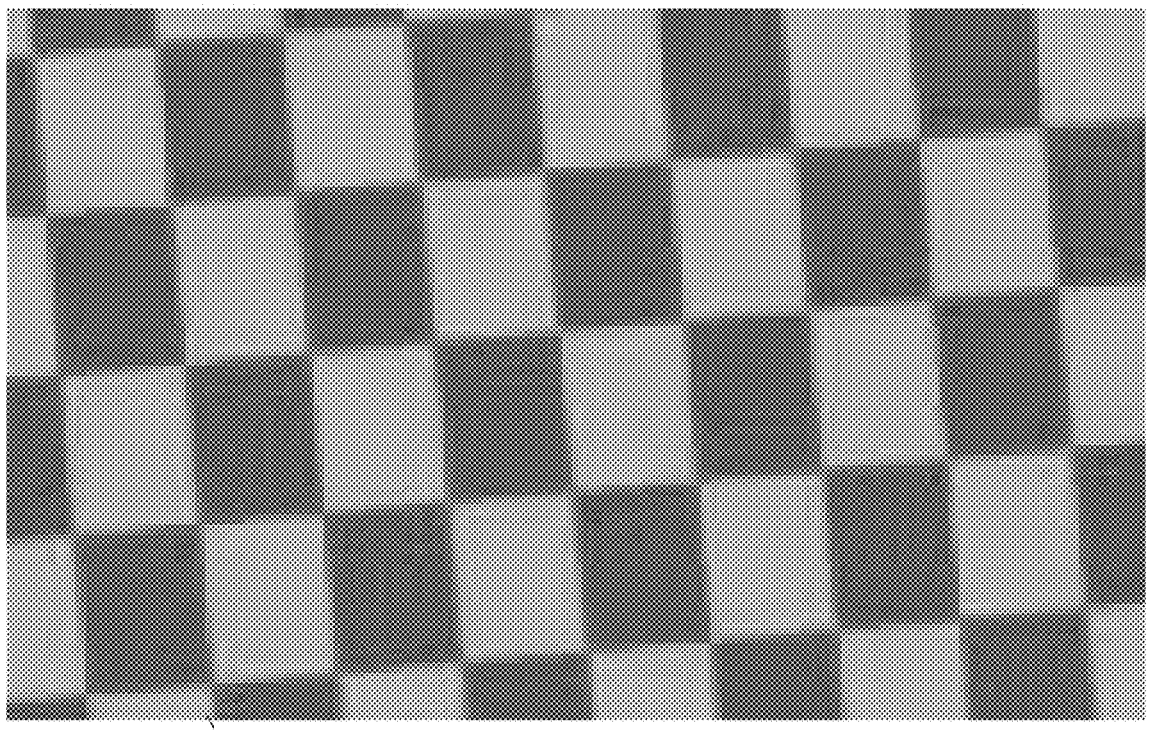
FIG. 9b shows a representation of the first example image when it is output from the processing module.

FIG. 9b shows an image 904 which is a representation of the first example image 902 when it is output from the processing module 210. It can be seen that almost all of the defective pixels have been fixed. In particular, all single and double defective pixels have been fixed and most triple and quad defective pixel groups have been fixed. It is also apparent that the noise in the flat regions of the image has been reduced. The edges between the different coloured regions have been sharpened.

Figure 10A:
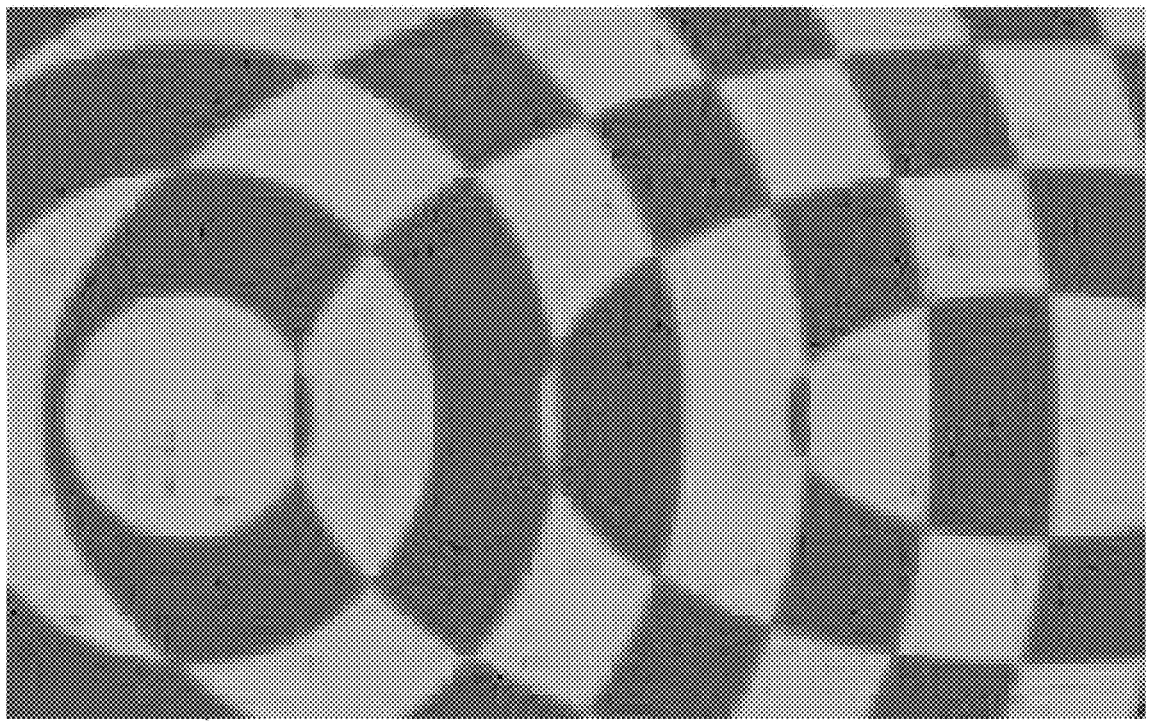
FIG. 10a shows a representation of a second example image which is received at the processing module.

FIG. 10a shows a representation of a second example image 1002 which is received at the processing module 210. The image 1002 has also been artificially generated as a test image so that it has a large number of defective pixels (again, approximately one in every 300 pixels is defective in the image 1002). The image 1002 has random noise applied to it, which can be seen in the 'speckled' nature of the otherwise flat regions. Furthermore, the image 1002 has been downsampled so the edges between different regions have been blurred. It is further noted that the edges in image 1002 are circular so they are at different orientations at different positions in the image.

Figure 10B:
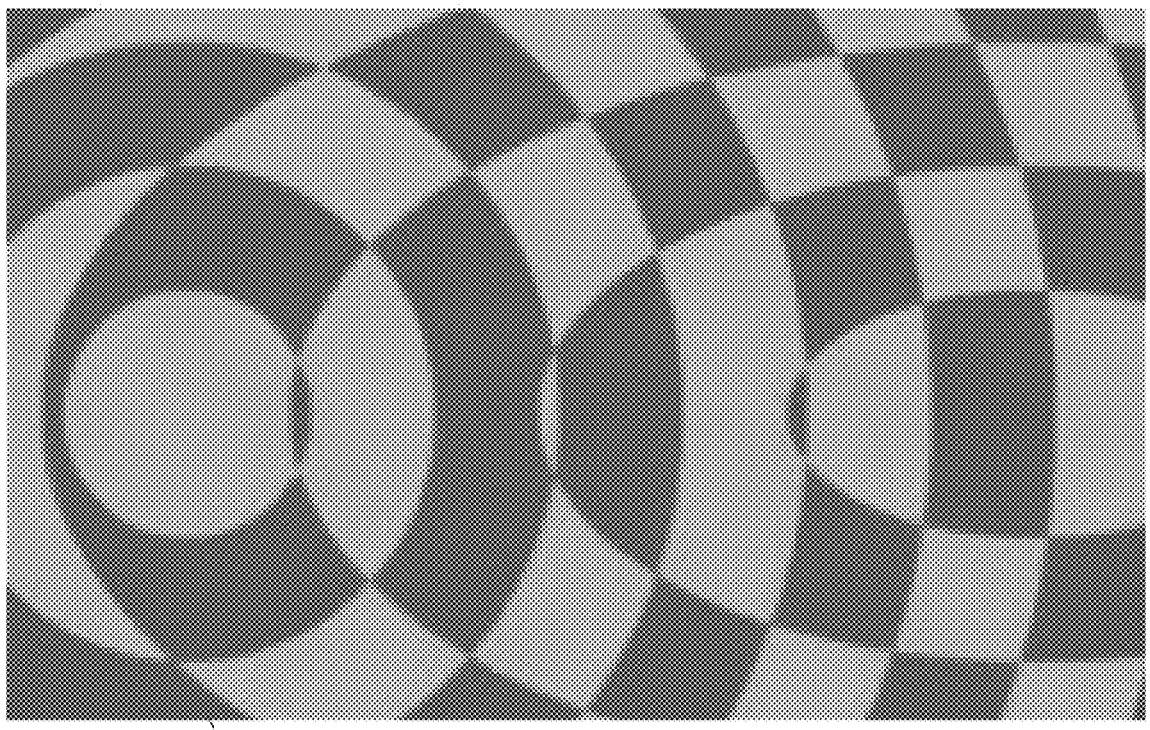
FIG. 10b shows a representation of the second example image when it is output from the processing module.

FIG. 10b shows an image 1004 which is a representation of the second example image 1002 when it is output from the processing module 210. It can be seen that almost all of the defective pixels have been fixed. Again, all single and double defective pixels have been fixed and most triple and quad defective pixel groups have been fixed. It is also apparent that the noise in the flat regions of the image has been reduced. The edges between the different coloured regions have been sharpened, at all edge orientations.

The examples shown in FIGS. 9a to 10b illustrate how effective the processing can be. Furthermore, this is achieved with a single processing module to implement defective pixel detection, defective pixel correction, denoising and sharpening, rather than with separate processing modules for each separate function. Furthermore, the kernel used in the processing module is a 5×5 kernel in the example used to process the images in FIGS. 9a to 10b, which is smaller than may have been used previously in one processing module implementing one of the processing functions. Implementing fewer and smaller processing modules leads to smaller silicon area and lower power consumption (as functionality is not replicated in numerous processing modules), and the different processing functions do not make contradictory decisions, so the resulting images are better and tuning is simpler. This is achieved applying the Bayesian principle to the grouping process as described above, such that knowledge of the grouping is carried over from one iteration to the next iteration.

In the examples shown in FIGS. 4 and 5 the subsets of pixel values 406 and 506 are 5×5 blocks of pixel values. In other examples, the subsets may have different sizes.

Furthermore, in the examples described above, the subsets of pixel values are square, e.g. kernels 406 and 506 are square. However, in other examples, the subsets of pixel values may be non-square blocks of pixel values. For example, it may be beneficial to use subsets which represent blocks of pixel values which are wider than they are tall. Just to give an example, subsets could be 3×5 blocks of pixel values (i.e. three rows and five columns). Since the line store module 208 stores rows of data values, (e.g. as they arrive in raster scan order), a reduction in the number of rows means that the line store module 208 can have a reduced size, and a delay incurred in waiting for the line store module 208 to receive enough pixel values for the processing module 210 to process pixel values can be reduced. Whilst it may be advantageous to reduce the number of rows in the subsets for the reasons given above, the same is not true for reducing the number of columns in the subsets (when the data values are received in rows, e.g. in raster scan order or Boustrophedon order), so it can be beneficial to have subsets which have more columns than rows (i.e. they are wider than they are tall). This allows the subsets to retain a large overall size, whilst reducing the number of rows in the subsets. The size and shape of the subsets may be designed in dependence on the processing functions performed by the processing module 210.

In the examples described above, the subset of pixel values for a particular pixel value includes and surrounds the particular pixel value, e.g. the subset is centred on the particular pixel value. Pixel values which are on, or near, the edge of the image may be handled in different ways. For example, the size and/or shape of the kernel (or "subset") for a pixel on or near the image edge could be modified to account for the edge of the image. Alternatively, the image could be extended (e.g. by reflection of existing pixel values across the image edge) such that the size and shape of the kernel (or "subset") for a pixel on or near the image edge does not need to be modified. The treatment of edge pixels can vary in different implementations.

In the methods described above with reference to FIG. 3, after the data values are received at the processing module, there is a "start-up" procedure (including steps S306 to S314) for the first subset (which can be considered to be for index i=0), and then there is a "recurrent" procedure (including steps S318 to S330) which are performed for subsequent subsets (e.g. for i≥1). As described above, the recurrent procedure is much simpler to implement than the start-up procedure. In some examples, the start-up procedure is not performed, such that the recurrent procedure can be performed for each of the subsets. This is simpler to implement, and means that the same procedure is performed for all of the pixel values, so the hardware can be simplified. The recurrent procedure could start with the first pixel in the image, e.g. using a single group with the average value ($\mu$) set to 0.5. This may cause artifacts in the first one or more pixels to be processed, but it would be simple to implement. Alternatively, the recurrent procedure could start one or more pixels (e.g. two pixels) before (e.g. to the left of) the first pixel to be processed in the image, e.g. by making use of the reflected region of the image extending beyond the edges of the image. Starting with a single group with $\mu$=0.5, would mean that the first iteration has a single group into which all of the pixel values are classified, and the group indication data (e.g. average of the pixel values) for the group may be carried forward to the second iteration. In the second iteration, multiple groups, e.g. three groups, may be defined (e.g. a first group surrounding the average value carried forward from first iteration, a group for values below the first group, and a group for values above the first group). Pixel values can be classified into the three groups, and the group indication data (e.g. averages of the pixel values) for the three groups can be carried forward to the third iteration. The third iteration may be for the first "real" (i.e. non-reflected) pixel to be processed, e.g. the top left pixel of the image. The recurrent procedure defined above (e.g. steps S318 to S332) can then be performed for the first pixel in the image based on the group indication data (e.g. the three averages of the pixel values) for the groups, and then the process can proceed as described above.

So the start-up procedure (i.e. steps S306 to S314) is not necessarily performed in all examples. In examples in which initial iterations are performed for reflected pixels which do not lie in the image, these initial iterations can be performed during the horizontal blanking interval, such that there is little or no perceptible latency caused by performing the initial iterations. In some examples, more than two initial iterations (or just one initial iteration) may be performed before iterations are performed for real pixel values in the image. By making use of image reflection, the group indication data for the groups will become well trained by the time data is processed for real pixel values of the image. These initial iterations for reflected pixels, might only be performed prior to performing an iteration for the first pixel of the image (e.g. the top left pixel of the image, when the image is processed in raster scan order). For subsequent rows of pixels, the iteration for the left-most pixel of a row can use the group indication data stored for the left-most pixel of the line above. This means that the group indication data for the left-most pixel of a line may be stored in the store 212 at least until it is used for processing the left-most pixel of the line below.

The examples given above are described in terms of an image processing system 204 which processes pixel values. The same principles can apply to other types of data processing system, e.g. where data values are not pixel values.

For example, the stream of data values may represent a one-dimensional array of data values. In this case, each of the subsets of data values within the stream of data values represents a contiguous block of data values within the one-dimensional array.

For example, a 1D stream of data values could be used if the data processing system is an audio processing system and the data values are audio samples of an audio signal. For example, the audio signal could be received and sampled at a microphone and the audio samples can be passed to the audio processing system. The audio processing system may perform some processing functions, some of which may implement a clustering process according to the Bayesian approach as described herein, whereby group indication data is stored in one iteration for use in defining a set of groups in a subsequent iteration when processing the next data value in the stream. Processed audio samples of the audio signal can be outputted, e.g. via a speaker.

In another example, a 1D stream of data values could be used if the data processing system is a signal processing system and the data values are signal samples of a transmitted signal. For example, the signal could be received over a wired or wireless channel, at a device in which the signal processing system is implemented. The device can sample the received signal and then the signal processing system may perform some processing functions, some of which may implement a clustering process according to the Bayesian approach as described herein whereby group indication data is stored in one iteration for use in defining a set of groups in a subsequent iteration when processing the next data value in the stream. The processed signal samples can be used to extract the data from the received signal.

In the examples described above, a pixel value may be replaced by an average of a plurality of pixel values. For example, a pixel value is replaced by an average value of one or more of the maintained groups if the pixel value is determined to be representative of a defective pixel, i.e. if the pixel value is not in one of the maintained groups. Furthermore, if a pixel is within one of the maintained groups (e.g. if it is determined not to be representative of a defective pixel) then denoising may be applied in which the pixel value is replaced by an average value of the group in which it is located. When pixel values are replaced by averages of multiple pixel values, dynamic range enhancement can be applied whereby the number of bits used to represent the pixel value can be increased. The average value could be, for example, the mean, a weighted mean or a mean of a trimmed set of the pixel values in the group (e.g. the mean of the interquartile of pixel values in a group) to give just some examples of average values which could be used. By determining an average of pixel values which have been classified into the same group, the number of bits of accuracy of the average value can be greater than the number of bits of each individual pixel value. This is because the averaging process reduces the noise. In other words, the averaging process increases the signal to noise ratio (SNR). This means that the SNR of the pixel values output from the processing module 210 may be greater than the SNR of the pixel values captured by an image sensor (e.g. the image sensor 202) and provided to the image processing system 204. Therefore, the average value may be determined with a greater number of bits than the pixel value which it is to replace. Increasing the number of bits in this manner increases the dynamic range of the pixel values. The clustering approach allows the average value to be determined from a group of pixel values which are similar to the pixel value to be replaced (similar in terms of location, i.e. they are all within the same subset of pixel values, and similar in terms of pixel values because they have been grouped into the same group). Therefore, the averaging reduces the random noise in a deterministic way, thereby improving the signal to noise ratio. For example, random errors which may be reduced include errors resulting from analogue to digital conversion (ADC noise), thermal noise, quantisation noise, power plane noise and random Gaussian noise, to give some examples. Averaging over the whole kernel would blur or soften edges within the kernel. However, by averaging over the pixel values within a single group of similar pixel values, the edges between groups within the kernel are not damaged. The outputted pixel values (i.e. the averaged pixel values) have more bits per pixel than the incoming pixel values, and the outputted bits have better SNR than the incoming pixel values.

Figure 11:
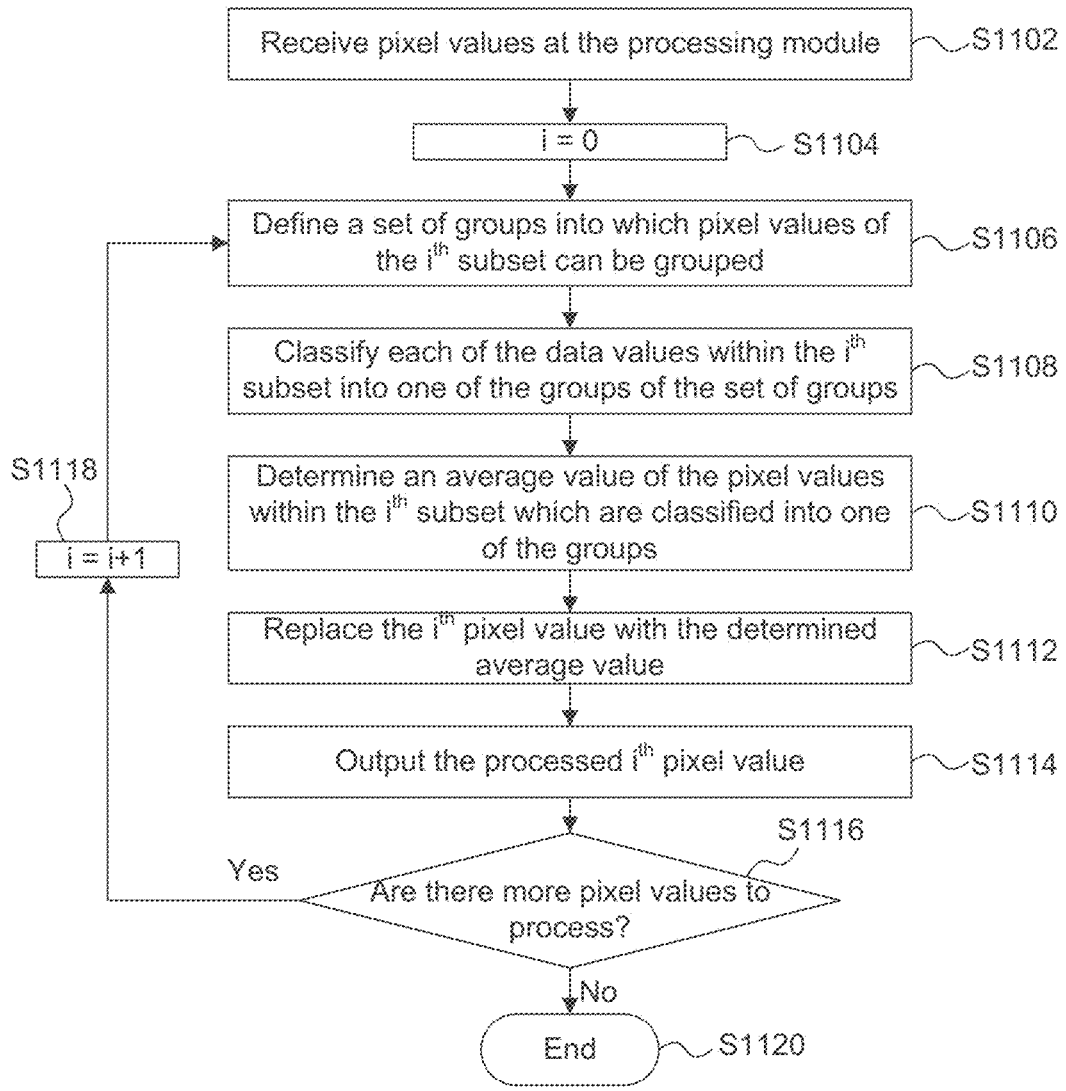
FIG. 11 is a flow chart for a method of implementing dynamic range enhancement.

More generally, a dynamic range enhancement method could be applied without necessarily being part of the example method shown in FIG. 8. For example, FIG. 11 illustrates a flow chart for a method of implementing a dynamic range enhancement which may be performed by the processing module 210 using the clustering approach described above. In step S1102 pixel values are received at the processing module 210. Each of the received pixel values has a first number of bits, e.g. each received pixel value may have $b_{input}$ bits where to give just some examples, $b_{input}$ may be 8, 10 or 12, etc. In step S1104 an index i is set to zero. In step S1106 a set of groups are defined into which pixel values of the $i^{th}$ subset can be grouped. The $i^{th}$ subset may for example include the pixel values within a kernel (e.g. the kernel 406 or the kernel 506), which may be centred on the $i^{th}$ pixel value. The groups may be defined as described in the examples above, e.g. in step S306 or in step S320. In step S1108 each of the data values within the $i^{th}$ subset is classified into one of the defined groups. As described above, the classification of pixel values into groups may be based on a comparison of the pixel value with value ranges defined for each of the groups, or may be based on detecting one or more edges within the kernel and classifying the pixel values based on the positions of the pixel values within the kernel relative to the detected edge (s).

In step S1110 an average value of the pixel values within the $i^{th}$ subset which are classified into one of the groups is determined. For example, step S1110 may involve determining an average value of the pixel values which have been classified into the same group as the $i^{th}$ pixel value (i.e. the pixel value at the centre of the $i^{th}$ subset). As described above, the average value could be, for example, the mean, a weighted mean or a mean of a trimmed set of the pixel values in the group (e.g. the mean of the interquartile of pixel values in a group) to give just some examples of average values which could be used. The determined average value has a second number of bits, $b_{average}$, which is greater than the first number of bits, $b_{input}$, i.e. $b_{average} > b_{input}$. For example, $b_{average}$ could be one, two, three or four greater than $b_{input}$, just to give some examples. As explained above, more bits can be used for the average value (compared to the number of bits of the input pixel values) because averaging the pixel values over a particular group of similar pixel values increases the signal to noise ratio of the values. By using more bits for the average value, the average value has a greater precision than the input pixel values. Since the averaging is performed over similar pixel values (i.e. pixel values classified into the same group), the averaging does not blur the edges in the image.

In step S1112 the $i^{th}$ pixel value is replaced based on the determined average value. For example, the $i^{th}$ pixel value may be replaced with the determined average value.

In step S1114 the processed $i^{th}$ pixel value is outputted, e.g. from the processing module 210 for use in the image processing system 204. The processed pixel value may be used by other processing modules 214 within the image processing system 204, and/or outputted from the image processing system 204.

In step S1116 the processing module 210 determines whether there are any more pixel values to process, and if there are, then the method passes to step S1118 in which the index i is incremented. The method then passes back to step S1106 and the method repeats by performing steps S1106 to S1116 for the next pixel value. If it is determined in step S1116 that there are no more pixel values to process then the method ends in step S1120.

In the method shown in FIG. 11 each processed pixel value is outputted as it has been determined (in step S1114). It would be possible to output groups of processed pixel values in batches when a whole batch of pixel values has been processed. For example, when a row of pixel values have been determined then all of the processed pixel values in that row could be outputted together. Furthermore, the method could wait until all of the pixel values within an image have been processed before any of them are outputted.

According to the method shown in FIG. 11, the number of bits of an outputted pixel value is greater than the number of bits of an input pixel value. Therefore, the dynamic range of the pixel values can be increased. For example, each of the outputted pixel values may have one or two more bits than the corresponding input pixel values. Based on a typical group having 8 or 16 pixel values within it, according to the central limit theorem, 1.5 to 2 more bits of accuracy can be achieved by averaging the pixel values. The averaging process described above allows the amount of data in an output pixel value can be greater than the amount of data in the corresponding input pixel value because information is shared over multiple pixel values.

It is worth noting that this is not the same as super-resolution which generates a higher density of pixels than the source image, because with the dynamic range enhancement described herein, the same pixel density is maintained but the number of useful bits per pixel for each pixel is increased.

It is further worth noting that this is not the same as temporal denoising, which operates in the temporal domain, rather than the spatial domain (as in the averaging process described above), though the accuracy, effect and impact of temporal denoising will be improved whenever the spatial noise reduction is enhanced.

An image processing system is described herein and shown in FIG. 2 as comprising a number of functional blocks. This is schematic only and is not intended to define a strict division between different logic elements of such entities. Each functional block may be provided in any suitable manner. It is to be understood that intermediate values described herein as being formed by an image processing system need not be physically generated by the image processing system at any point and may merely represent logical values which conveniently describe the processing performed by the image processing system between its input and output.

The processing systems described herein (i.e. the image processing systems and data processing systems) may be embodied in hardware on an integrated circuit. The processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an image processing system or data processing system configured to perform any of the methods described herein, or to manufacture an image processing system or data processing system comprising any apparatus described herein. An integrated circuit definition dataset may be, for example, an integrated circuit description.

Therefore, there may be provided a method of manufacturing, at an integrated circuit manufacturing system, an image processing system or data processing system as described herein. Furthermore, there may be provided an integrated circuit definition dataset that, when processed in an integrated circuit manufacturing system, causes the method of manufacturing an image processing system or data processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an image processing system will now be described with respect to FIG. 12.

Figure 12:
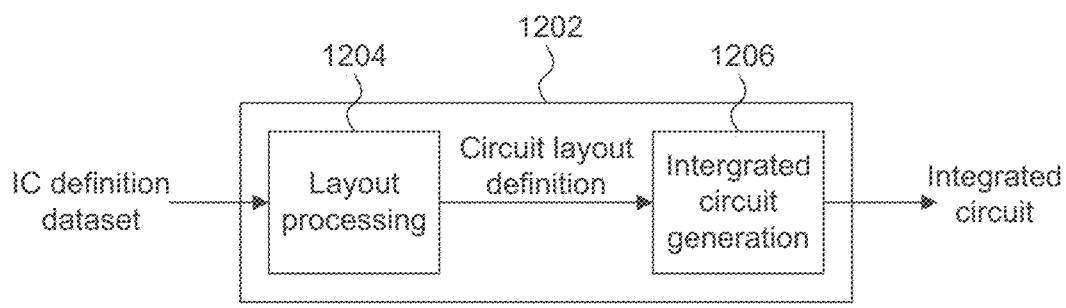
FIG. 12 shows an integrated circuit manufacturing system for generating an integrated circuit embodying a data processing system.

FIG. 12 shows an example of an integrated circuit (IC) manufacturing system 1202 which is configured to manufacture an image processing system as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining an image processing system as described in any of the examples herein), process the IC definition dataset, and generate an IC according to the IC definition dataset (e.g. which embodies an image processing system as described in any of the examples herein). The processing of the IC definition dataset configures the IC manufacturing system 1202 to manufacture an integrated circuit embodying an image processing system as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an image processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An image processing system comprising a processing module configured to process a plurality of pixel values, wherein for each of one or more of the plurality of pixel values, the processing module is configured to:
   implement processing of the pixel value by operating on a spatial subset of the pixel values by:
      defining, for the spatial subset, a set of one or more groups into which pixel values within the spatial subset can be grouped;
      classifying each of the pixel values within the spatial subset into one of the groups of the set of one or more groups based on the value of that pixel value;
      processing the pixel value using one or more of the pixel values of the spatial subset in dependence on the classification of the pixel values of the spatial subset into the one or more groups; and
      outputting the processed pixel value.

2. The image processing system of claim 1, wherein the classification of a pixel value into one of the groups is not based on the spatial position of the pixel value.

3. The image processing system of claim 1, wherein said defining a set of one or more groups comprises defining a pixel value range for each of the groups, and wherein said classifying each of the pixel values within the spatial subset into one of the groups comprises comparing the pixel value to one or more of the defined pixel value ranges for the groups.

4. The image processing system of claim 1, wherein the set of one or more groups comprises a plurality of groups.

5. The image processing system of claim 4, wherein the set of groups comprises three or more groups.

6. The image processing system of claim 1, wherein said processing the pixel value comprises performing, in a consolidated operation, multiple processing functions which depend upon the classification of pixel values of the spatial subset into the one or more groups.

7. The image processing system of claim 1, further comprising a store configured to store group indication data which indicates one or more groups into which pixel values can be grouped,
   wherein the processing module is configured to process, in each of a plurality of iterations, a respective pixel value of the stream by operating on a respective spatial subset of pixel values of the stream, in each of the plurality of iterations operating by:
      retrieving, from the store, group indication data for at least one group;
      using the retrieved group indication data to define the set of groups into which pixel values within the spatial subset can be grouped;
      performing said: (i) classifying each of the pixel values within the spatial subset into a group of a set of groups, and (ii) processing the pixel value using one or more of the pixel values of the spatial subset in dependence on the classification of the pixel values of the spatial subset into the groups; and
      storing, in the store, group indication data for at least one group of the set of groups, for use in a subsequent iteration.

8. The image processing system of claim 7, wherein said storing group indication data for at least one group comprises storing at least one of:
   as an indicative value for a group, an average value of the pixel values which are classified as being part of that group;
   an indication of the spread of the data values which are classified as being part of that group;
   an indicative position of the data values which are classified as being part of that group; and
   an indication of the number of members of the group.

9. The image processing system of claim 1, wherein group indication data for a group indicates a range of pixel values which are to be classified into the group.

10. The image processing system of claim 9, wherein the group indication data for a group comprises an indicative value within the range of pixel values which are to be classified into the group.

11. The image processing system of claim 9, wherein the group indication data for a group comprises indications of the upper and lower bounds of the range of pixel values which are to be classified into the group.

12. The image processing system of claim 1, wherein the image processing system is implemented in a camera pipeline, wherein the plurality of pixel values are part of a stream of pixel values, and wherein the image processing system is configured to process the pixel values in real-time.

13. The image processing system of claim 12, wherein the stream of pixel values represents an image as a two-dimensional array of pixel values, and wherein each of the spatial subsets of pixel values within the stream of data values represents a contiguous block of pixel values within the two-dimensional array.

14. The image processing system of claim 13, wherein the contiguous block of pixel values is smaller than the two-dimensional array which represents the image.

15. The image processing system of claim 1, wherein the set of groups comprises up to n groups, and wherein the processing module is further configured to:
   after the classification of the pixel values of the spatial subset into the groups, and prior to said processing the pixel value, selectively discard one or more of the groups based on the number of pixel values which are classified into each of the groups, such that up to m groups are maintained, where n≥m.

16. The image processing system of claim 15, wherein said processing the pixel value using one or more of the pixel values of the spatial subset in dependence on the classification of the pixel values of the spatial subset into the one or more groups comprises:
   if the pixel value is within a maintained group, determining that the pixel value is not representative of a defective pixel; and
   if the pixel value is not within a maintained group, determining that the pixel value is representative of a defective pixel.

17. The image processing system of claim 1, wherein the processing module is configured to:

determine, for each of at least one group of the set of groups, a centroid representative of a position of the group; and determine, for each of the at least one group of the set of groups, an average value of the pixel values within the group.

18. The image processing system of claim 17, wherein said processing the pixel value comprises applying one or more of denoising, sharpening and de-mosaicing to the pixel value based on the at least one determined centroid of the at least one group.

19. A method of processing a plurality of pixel values in an image processing system, the method comprising:
   for each of one or more of the plurality of pixel values:
      implementing processing of the pixel value by operating on a spatial subset of the pixel values, and operating by:
         defining, for the spatial subset, a set of one or more groups into which pixel values within the spatial subset can be grouped;
         classifying each of the pixel values within the spatial subset into one of the groups of the set of one or more groups based on the value of that pixel value;
         processing the pixel value using one or more of the pixel values of the spatial subset in dependence on the classification of the pixel values of the spatial subset into the one or more groups; and
         outputting the processed pixel value.

20. A non-transitory computer readable storage medium having stored thereon a computer readable dataset description of an integrated circuit that, when processed in an integrated circuit manufacturing system, causes the integrated circuit manufacturing system to manufacture an image processing system comprising a processing module configured to process a plurality of pixel values, wherein for each of one or more of the plurality of pixel values, the processing module is configured to:
   implement processing of the pixel value by operating on a spatial subset of the pixel values, and operating by:
      defining, for the spatial subset, a set of one or more groups into which pixel values within the spatial subset can be grouped;
      classifying each of the pixel values within the spatial subset into one of the groups of the set of one or more groups based on the value of that pixel value;
      processing the pixel value using one or more of the pixel values of the spatial subset in dependence on the classification of the pixel values of the spatial subset into the one or more groups; and
      outputting the processed pixel value.

\* \* \* \* \*